(12) United States Patent
Suzuki

(10) Patent No.: US 10,133,040 B2
(45) Date of Patent: Nov. 20, 2018

(54) ZOOM LENS, AN OPTICAL APPARATUS, AND A MANUFACTURING METHOD OF THE ZOOM LENS

(71) Applicant: Nikon Corporation, Minato-ku, Tokyo (JP)

(72) Inventor: Atsushi Suzuki, Tokyo (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 15/161,242

(22) Filed: May 21, 2016

(65) Prior Publication Data

US 2016/0349491 A1   Dec. 1, 2016

Related U.S. Application Data

(63) Continuation of application No. PCT/JP2014/005686, filed on Nov. 12, 2014.

(30) Foreign Application Priority Data

Nov. 21, 2013 (JP) .................................. 2013-240956
Nov. 21, 2013 (JP) .................................. 2013-240957

(51) Int. Cl.
*G02B 15/14* (2006.01)
*G02B 15/173* (2006.01)
(Continued)

(52) U.S. Cl.
CPC ............ *G02B 15/14* (2013.01); *G02B 5/005* (2013.01); *G02B 15/173* (2013.01); *G02B 27/646* (2013.01)

(58) Field of Classification Search
CPC .... G02B 15/177; G02B 5/005; G02B 15/173; G02B 27/646; G02B 9/60; G02B 9/62; G02B 9/64; G02B 13/0045
(Continued)

(56) References Cited

U.S. PATENT DOCUMENTS

2003/0165020 A1   9/2003   Satori et al.
2007/0229966 A1   10/2007  Nakatani et al.
(Continued)

FOREIGN PATENT DOCUMENTS

JP   2003-255228 A   9/2003
JP   2007-264174 A   10/2007
(Continued)

OTHER PUBLICATIONS

International Search Report from International Patent Application No. PCT/JP2014/005686, dated Feb. 17, 2015.
(Continued)

*Primary Examiner* — Darryl J Collins
(74) *Attorney, Agent, or Firm* — Shapiro, Gabor and Rosenberger, PLLC

(57) ABSTRACT

A first lens group (G1) having a positive refractive power, a second lens group (G2) having a negative refractive power, a third lens group (G3) having a positive refractive power, a fourth lens group (G4) having a negative refractive power, and a fifth lens group (G5) having a positive refractive power are arranged in order along an optical axis from an object, and distances between each lens group change when zooming, and the first lens group (G1) is composed of two lenses, and the following expression (1) is satisfied:

$0.07 < D1/fw < 0.46$ where D1 denotes a thickness on the optical axis of the first lens group (G1), and fw denotes a focal length of the zoom lens (ZL) in a wide-angle end state.

18 Claims, 15 Drawing Sheets

(51) Int. Cl.
*G02B 5/00* (2006.01)
*G02B 27/64* (2006.01)

(58) Field of Classification Search
USPC .................................................. 359/676, 683
See application file for complete search history.

(56) References Cited

U.S. PATENT DOCUMENTS

| | | |
|---|---|---|
| 2007/0229968 A1 | 10/2007 | Satori et al. |
| 2008/0088945 A1 | 4/2008 | Satori |
| 2008/0130131 A1 | 6/2008 | Nishio |
| 2008/0151392 A1 | 6/2008 | Nishimura |
| 2008/0204892 A1 | 8/2008 | Satori et al. |
| 2008/0231969 A1 | 9/2008 | Satori |
| 2009/0122418 A1* | 5/2009 | Atsuumi .............. G02B 15/173 359/684 |
| 2009/0147375 A1* | 6/2009 | Sudoh .................. G02B 15/173 359/684 |
| 2009/0174952 A1 | 7/2009 | Satori |
| 2011/0273780 A1 | 11/2011 | Hosoi et al. |
| 2011/0317280 A1 | 12/2011 | Saito |
| 2012/0087017 A1 | 4/2012 | Fujisaki |
| 2012/0092777 A1* | 4/2012 | Tochigi ................ G02B 15/173 359/684 |
| 2013/0021676 A1 | 1/2013 | Saito |
| 2013/0038765 A1 | 2/2013 | Fujisaki |
| 2013/0169846 A1 | 7/2013 | Yanai et al. |
| 2013/0258498 A1 | 10/2013 | Yanai et al. |
| 2013/0286277 A1 | 10/2013 | Yanai et al. |
| 2014/0085527 A1 | 3/2014 | Yamano |
| 2014/0085531 A1 | 3/2014 | Yamano |
| 2014/0268365 A1* | 9/2014 | Nishio .................... G02B 7/04 359/683 |
| 2014/0354857 A1* | 12/2014 | Kato .................... G02B 15/173 348/240.3 |

FOREIGN PATENT DOCUMENTS

| | | |
|---|---|---|
| JP | 2007-279587 A | 10/2007 |
| JP | 2007-286390 A | 11/2007 |
| JP | 2008-076493 A | 4/2008 |
| JP | 2008-107559 A | 5/2008 |
| JP | 2008-139754 A | 6/2008 |
| JP | 2008-139757 A | 6/2008 |
| JP | 2008-152190 A | 7/2008 |
| JP | 2008-209773 A | 9/2008 |
| JP | 2008-225328 A | 9/2008 |
| JP | 2009-163066 A | 7/2009 |
| JP | 2010-044190 A | 2/2010 |
| JP | 2011-237588 A | 11/2011 |
| JP | 2012-008449 A | 1/2012 |
| JP | 2012-083472 A | 4/2012 |
| JP | 2013-025086 A | 2/2013 |
| JP | 2013-037220 A | 2/2013 |
| JP | 2013-057801 A | 3/2013 |
| JP | 2013-137464 A | 7/2013 |
| JP | 2013-140307 A | 7/2013 |
| JP | 2013-210570 A | 10/2013 |
| JP | 2013-210571 A | 10/2013 |
| JP | 2013-231760 A | 11/2013 |
| JP | 2014-066944 A | 4/2014 |
| JP | 2014-066945 A | 4/2014 |
| JP | 2014-066946 A | 4/2014 |
| JP | 2015-072369 A | 4/2015 |
| JP | 2015-087535 A | 5/2015 |
| JP | 2015-087626 A | 5/2015 |

OTHER PUBLICATIONS

English Translation of International Preliminary Report on Patentability from International Patent Application No. PCT/JP2014/005686, dated Jun. 2, 2016.
Office Action dated Jul. 25, 2017, in Japanese Patent Application No. 2013-240956.
Office Action dated Jul. 25, 2017, in Japanese Patent Application No. 2013-240957.
Office Action dated Aug. 24, 2017, in Chinese Patent Application No. 201480063738.0 (with search report).
Office Action dated Oct. 3, 2017, in Japanese Patent Application No. 2013-240956.
Office Action dated Oct. 3, 2017, in Japanese Patent Application No. 2013-240957.

* cited by examiner

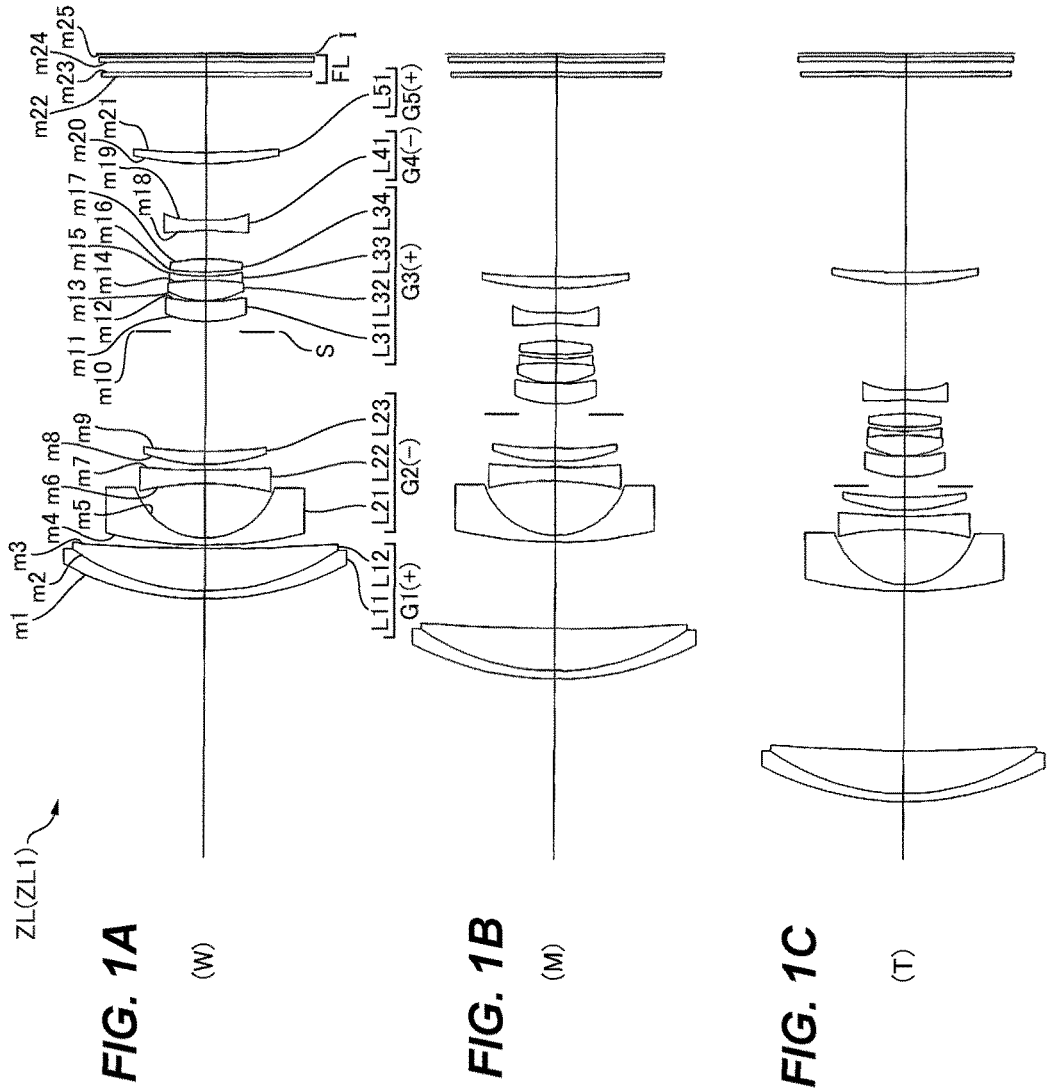

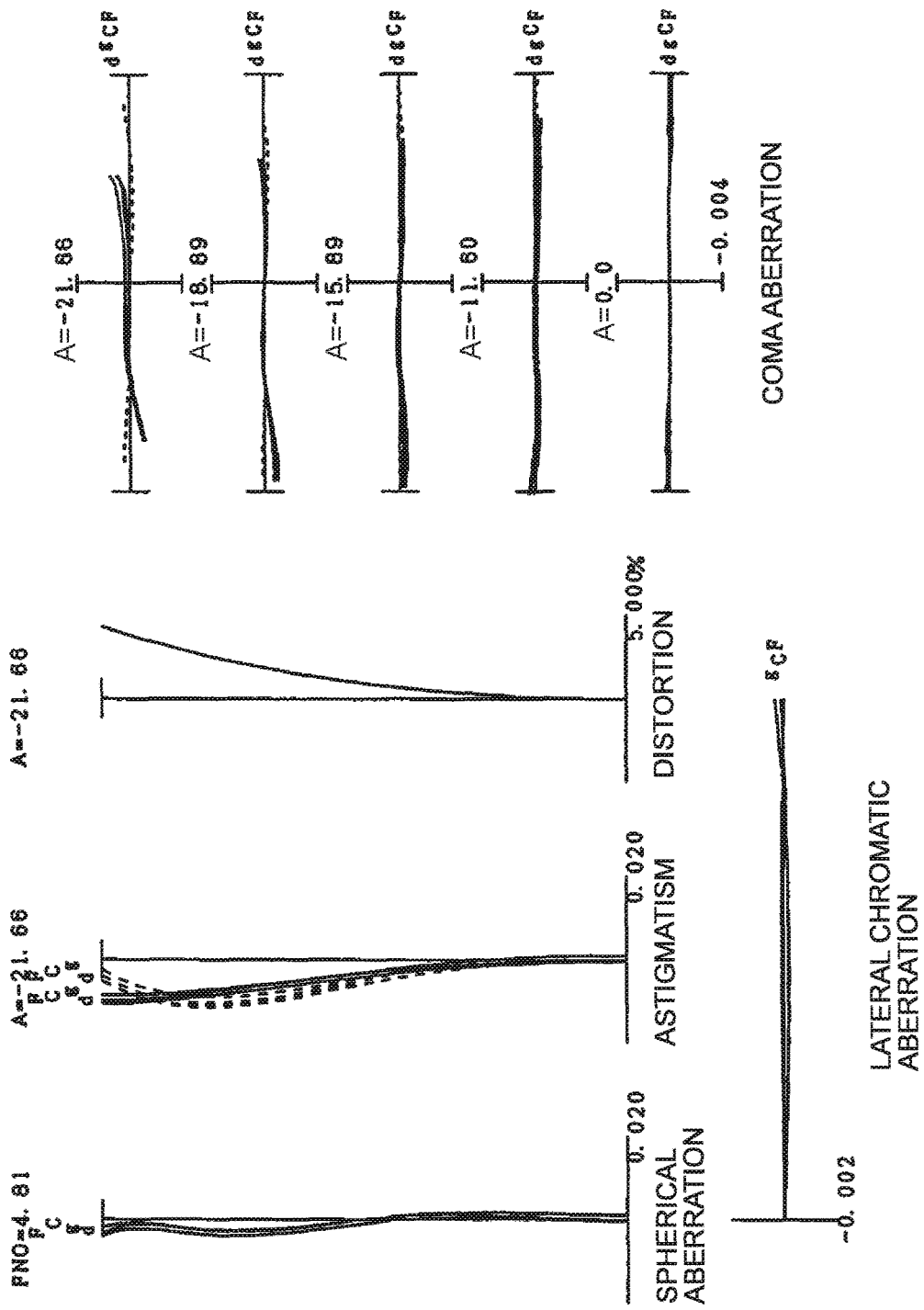

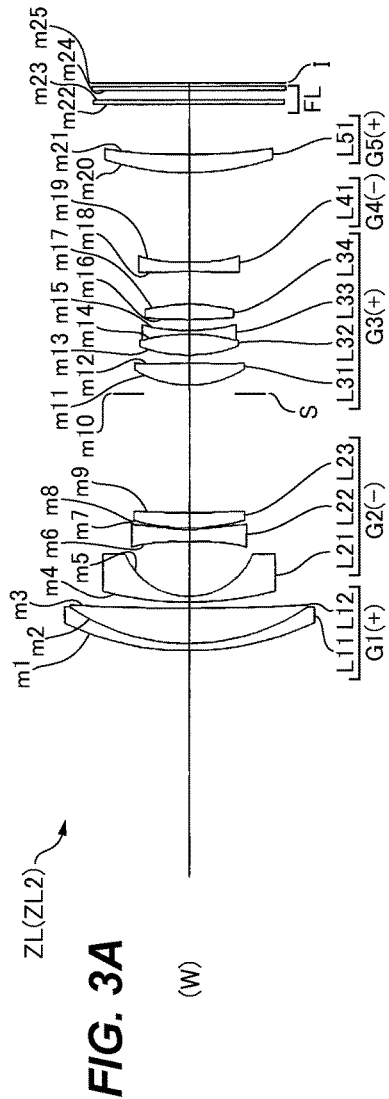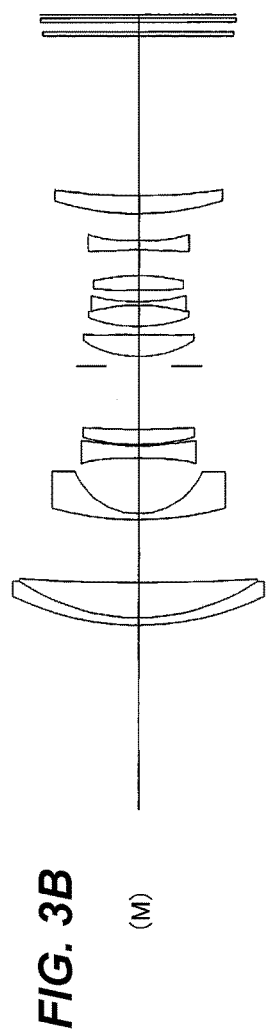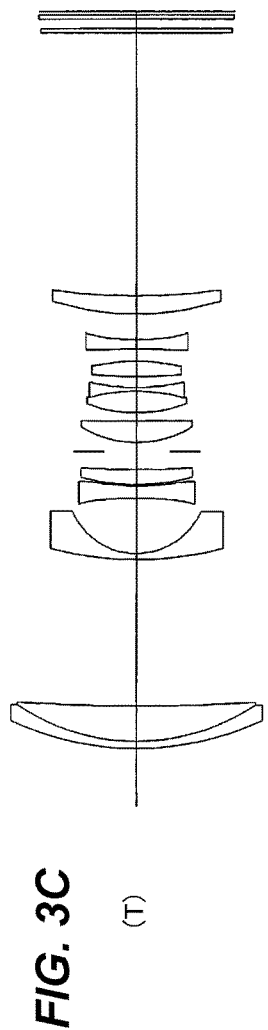
FIG. 3A (W)
FIG. 3B (M)
FIG. 3C (T)

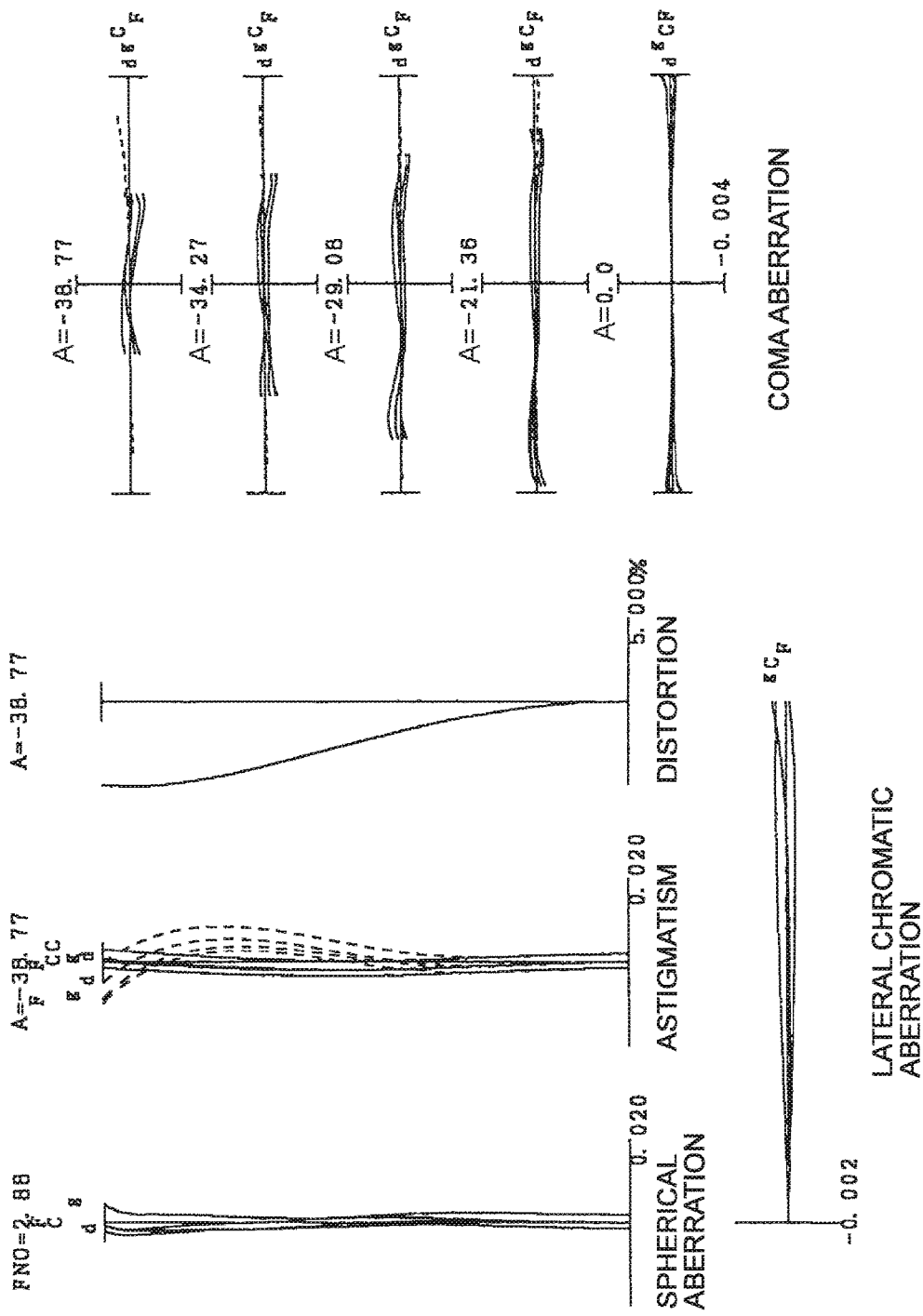

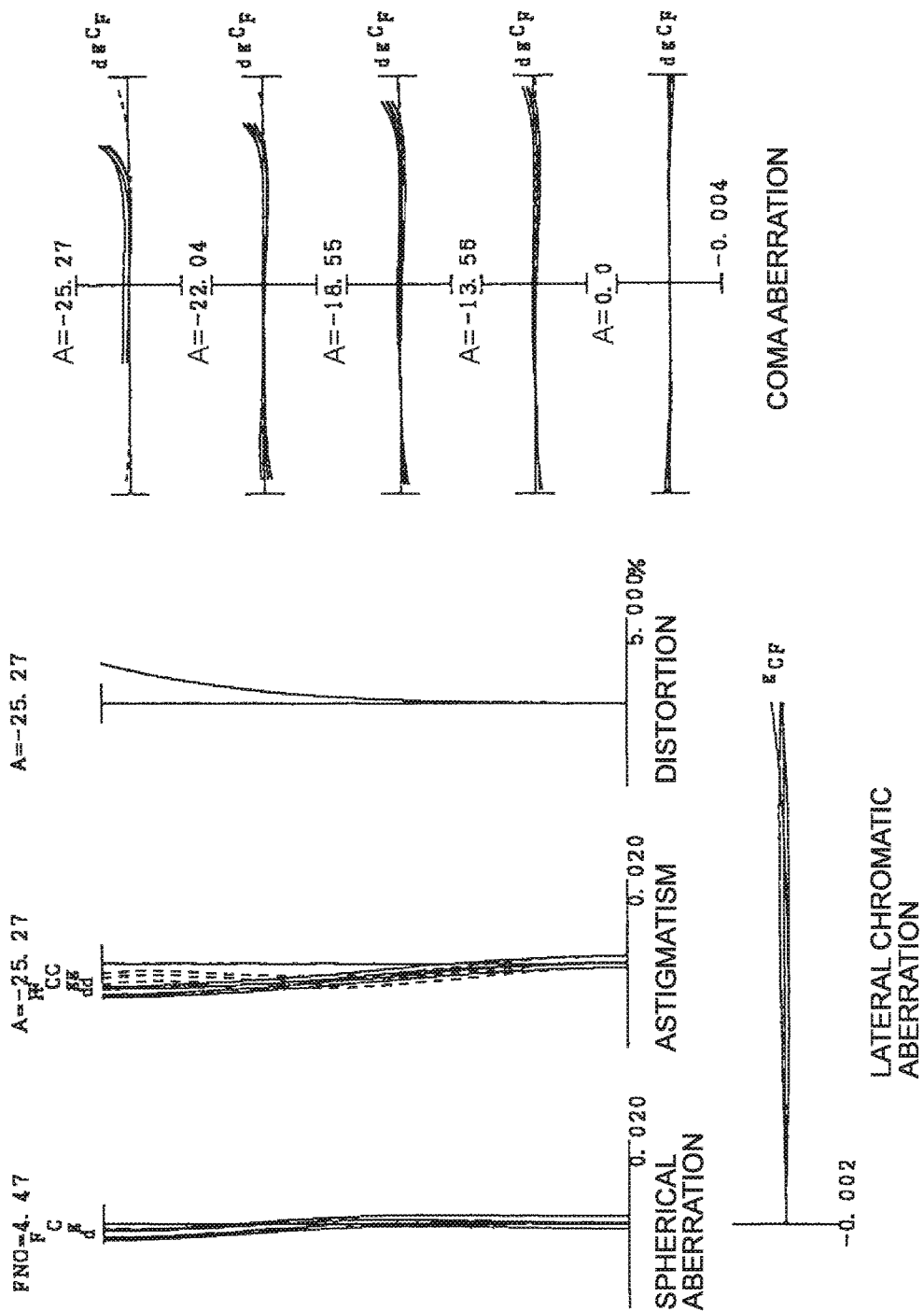

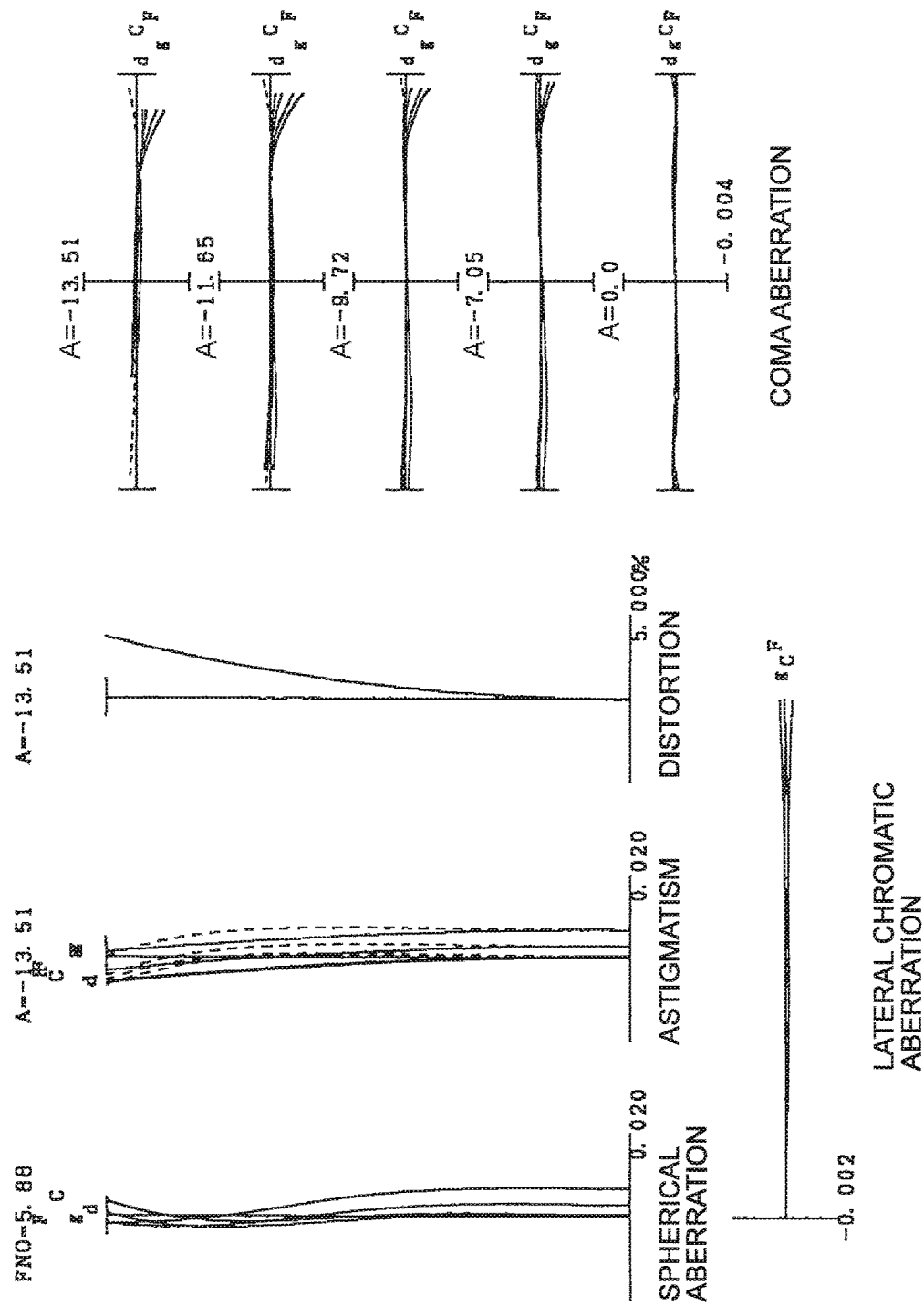

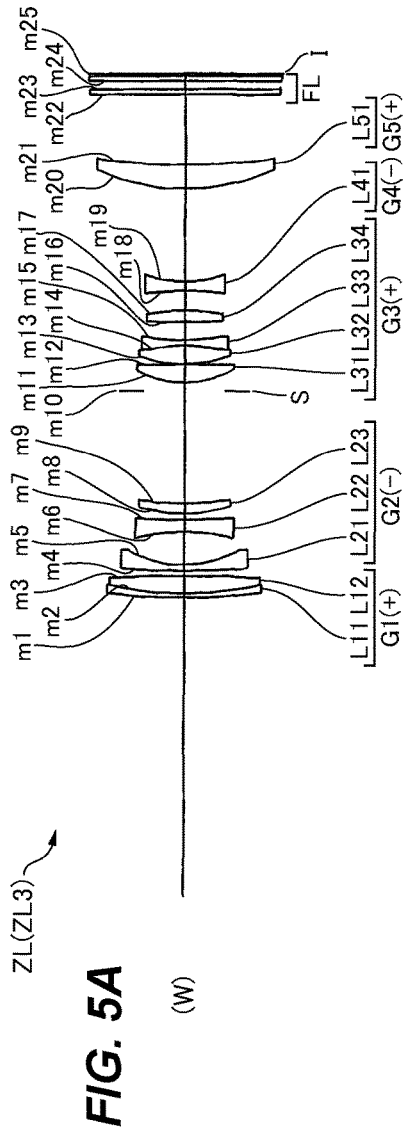
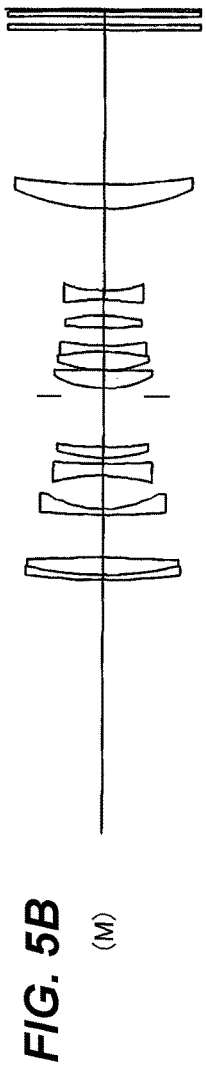
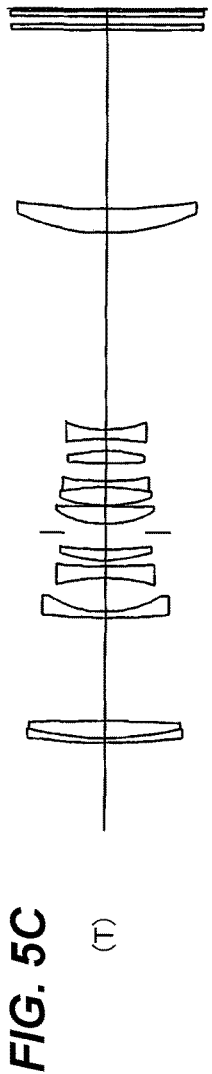
FIG. 5A (W)
FIG. 5B (M)
FIG. 5C (T)

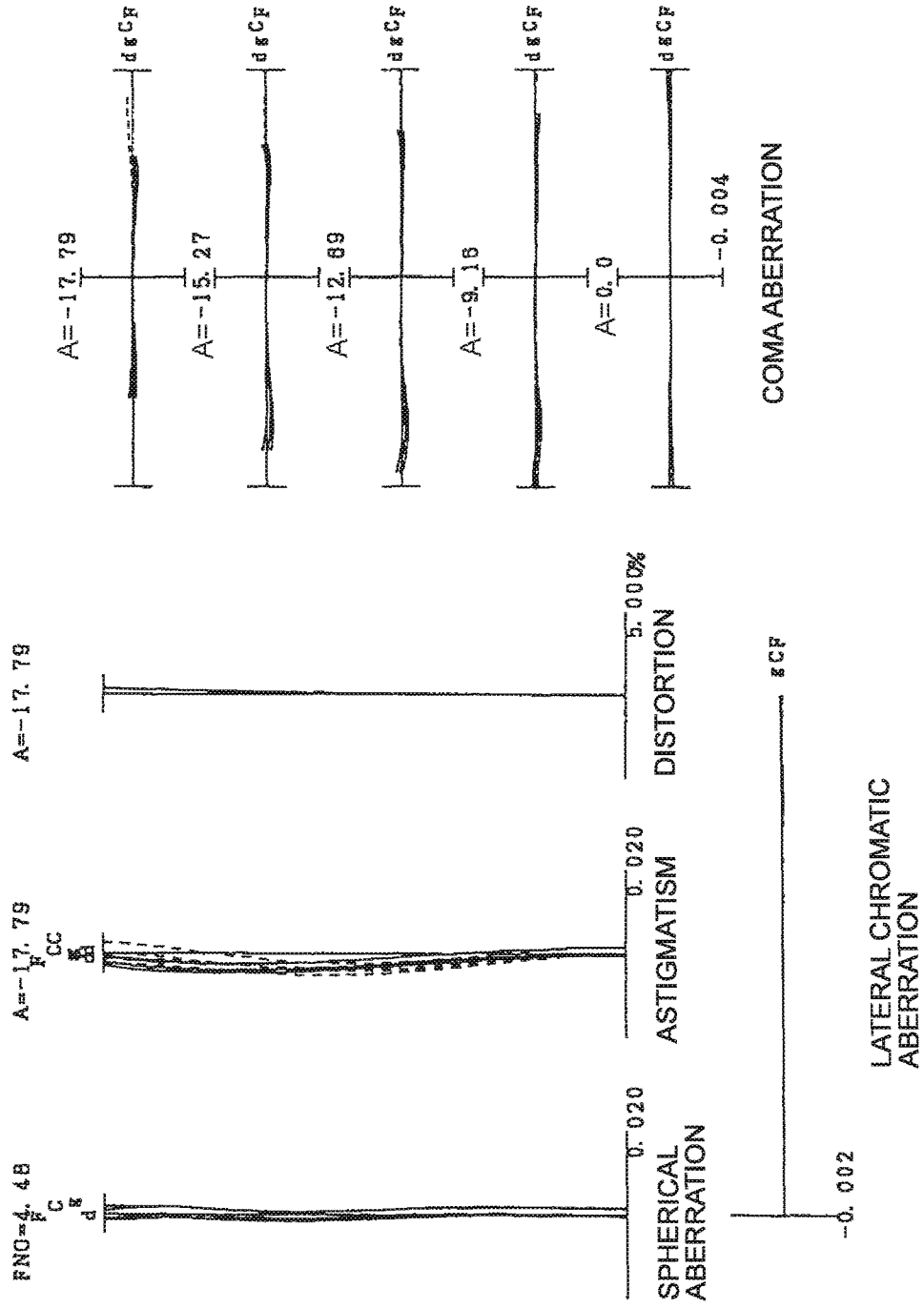

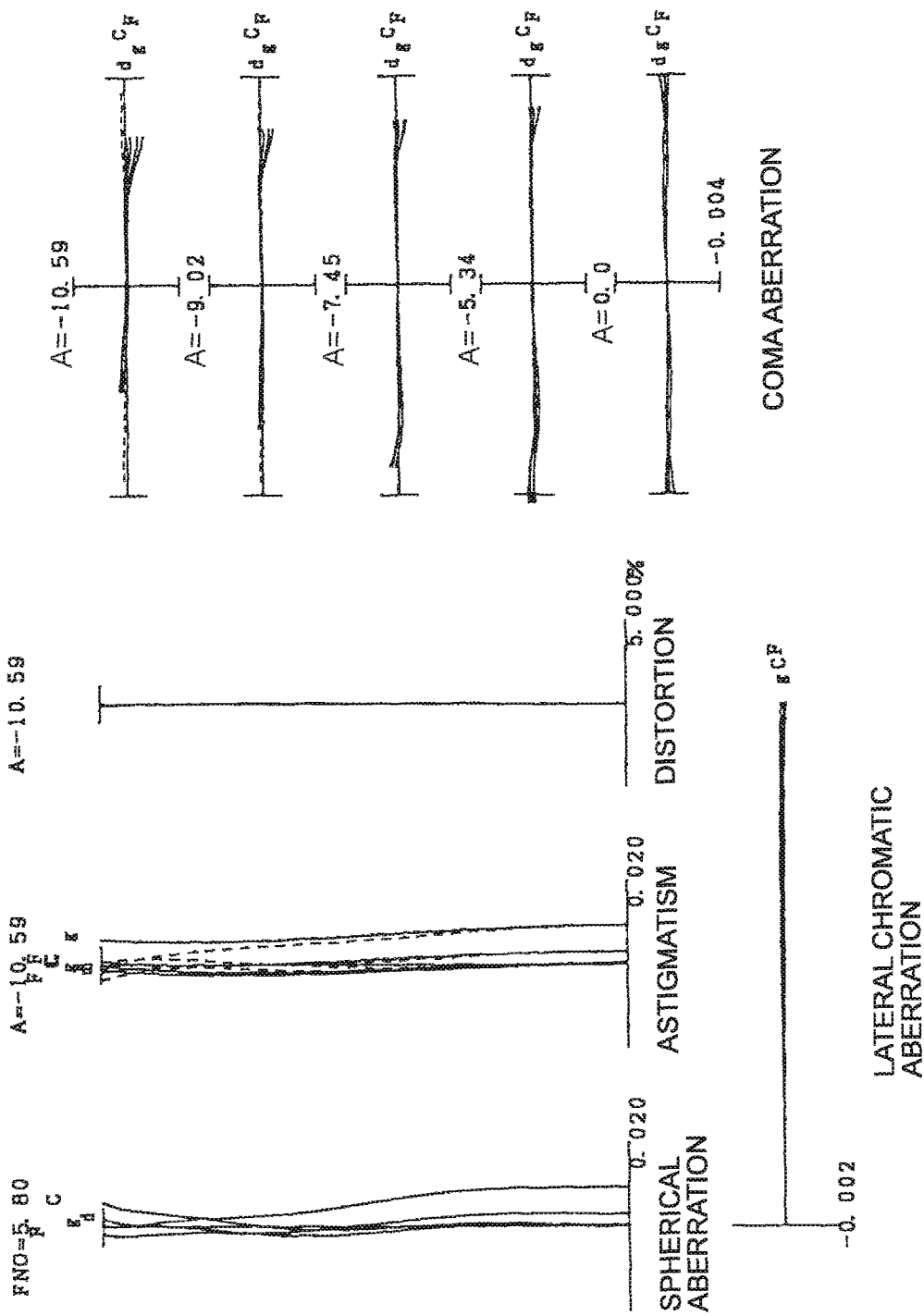

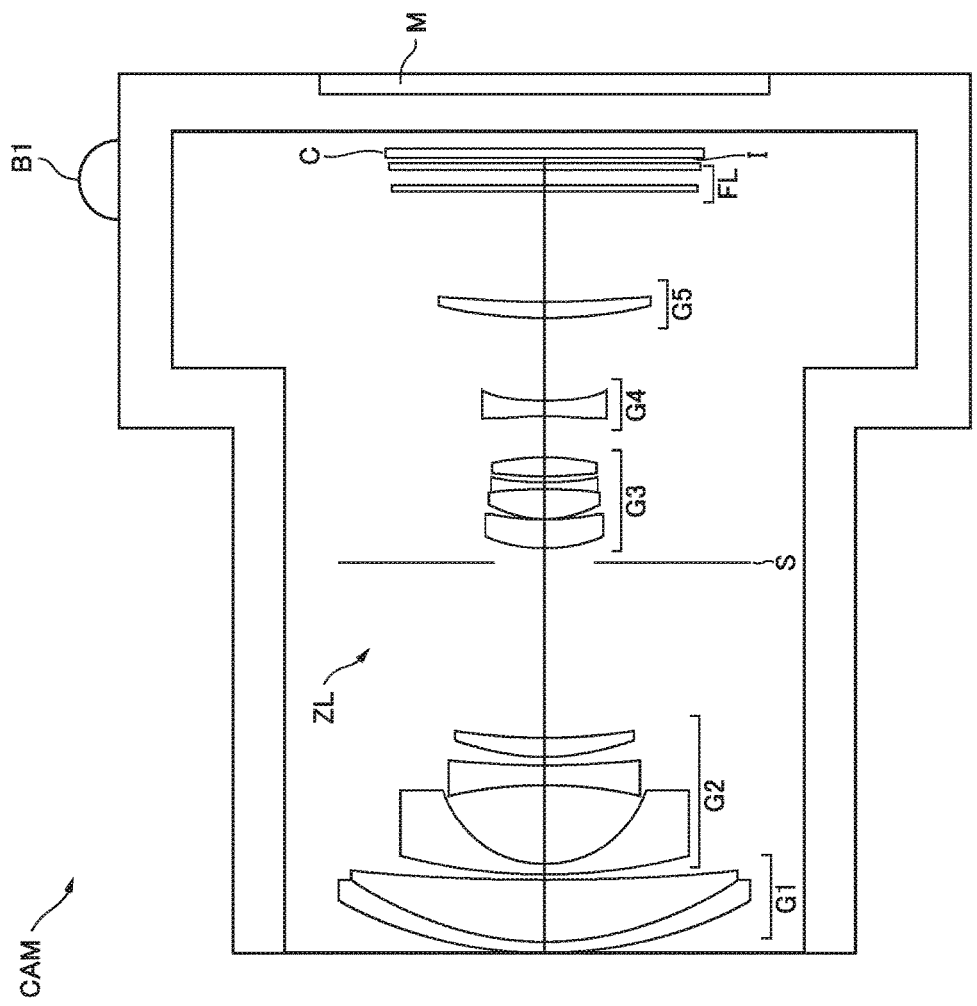

ZOOM LENS, AN OPTICAL APPARATUS, AND A MANUFACTURING METHOD OF THE ZOOM LENS

TECHNICAL FIELD

The present invention relates to a zoom lens, an optical apparatus, and a manufacturing method of the zoom lens.

TECHNICAL BACKGROUND

In recent years, thin zoom lenses are proposed (For example, refer to Patent Literature 1).

PRIOR ART LIST

Patent Document

PATENT DOCUMENT 1: Japanese Laid-Open Patent Publication No. 2010-044190 (A)

SUMMARY OF THE INVENTION

Problems to be Solved by the Invention

Regarding the zoom lenses, it is expected to realize ones which are further thinner than conventional ones.

The present invention is derived in view of such a problem, and aims to provide a zoom lens, an optical apparatus, and a manufacturing method of the zoom lens which is thin and has outstanding optical performance.

Means to Solve the Problems

In order to achieve such an object, a zoom lens according to the present invention comprises, in order on an optical axis from an object, a first lens group having a positive refractive power, a second lens group having a negative refractive power, a third lens group having a positive refractive power, a fourth lens group having a negative refractive power, and a fifth lens group having a positive refractive power, and distances of each lens group change when zooming, where the first lens group is composed of two lenses, wherein the following conditional expression is satisfied:

$$0.07 < D1/fw < 0.46$$

however,
where D1 denotes a thickness on the optical axis of the first lens group, and
fw denotes a focal length of the zoom lens in a wide-angle end state.

In the zoom lens according to the first present invention, it is preferable that all the lens groups move on the optical axis when zooming.

In the zoom lens according to the first the present invention, it is preferable that a distance on the optical axis from an surface closest to the object in the fifth lens group to an image surface is larger in a telephoto end state than that in a wide-angle end state.

In the zoom lens according to the first present invention, it is preferable that the following conditional expression is satisfied:

$$0.23 < (TL5-WL5)/ft < 1.20$$

however,
where WL5 denotes a distance on the optical axis from the surface closest to the object in the fifth lens group to the image surface in a wide-angle end state,
TL5 denotes a distance on the optical axis from the surface closest to the object in the fifth lens group to the image surface in a telephoto end state, and
ft denotes a focal length of the zoom lens in a telephoto end state.

In the zoom lens according to the first present invention, it is preferable that the first lens group is composed of, in order from the object, a negative lens and a positive lens.

In the zoom lens according to the first present invention, it is preferable that the first lens group is composed of a cemented lens which is composed of the two lenses.

In the zoom lens according to the first present invention, it is preferable that the second lens group is composed of, in order from the object, a negative lens, a negative lens, and a positive lens.

In the zoom lens according to the first present invention, it is preferable that the following conditional expression is satisfied:

$$0.08 < |(W45\beta - T45\beta)/(ft/fw)|$$

however,
where $W45\beta$ denotes composed magnification regarding the fourth lens group and the fifth lens group in a wide-angle end state,
$T45\beta$ denotes composed magnification regarding the fourth lens group and the fifth lens group in a telephoto end state,
ft denotes a focal length of the zoom lens in a telephoto end state, and
fw denotes a focal length of the zoom lens in a wide-angle end state.

The optical apparatus according to the first present invention has any one of the above mentioned zoom lenses.

The zoom lens according to a second present invention comprises, in order on an optical axis from an object, a first lens group having a positive refractive power, a second lens group having a negative refractive power, a third lens group having a positive refractive power, a fourth lens group having a negative refractive power, and a fifth lens group having a positive refractive power, and distances of each lens group change when zooming, and the first lens group is composed of two lenses, and the following conditional expression is satisfied:

$$0.08 < |(W45\beta - T45\beta)/(ft/fw)|$$

however,
where $W45\beta$ denotes composed magnification regarding the fourth lens group and the fifth lens group in a wide-angle end state,
$T45\beta$ denotes composed magnification regarding the fourth lens group and the fifth lens group in a telephoto end state,
ft denotes a focal length of the zoom lens in a telephoto end state, and
fw denotes a focal length of the zoom lens in a wide-angle end state.

An optical apparatus according to the second present invention has any one of the above mentioned zoom lenses.

A manufacturing method of a zoom lens according to the first present invention, the zoom lens comprising, in order along an optical axis from an object, a first lens group having a positive refractive power, a second lens group having a negative refractive power, a third lens group having a positive refractive power, a fourth lens group having a negative refractive power, and a fifth lens group having a positive refractive power, and distances between each lens group change when zooming, and the first lens group is composed of two lenses, and each lens is disposed in a lens-barrel so that the following conditional expression is satisfied:

$$0.07<D1/fw<0.46$$

however,
where D1 denotes a thickness on the optical axis of the first lens group, and
fw denotes a focal length of the zoom lens in a wide-angle end state.

In the manufacturing method of the zoom lens according to the first present invention, each lens is disposed in the lens-barrel so that a distance on the optical axis from a surface closest to the object in the fifth lens group to an image surface is larger in a telephoto end state than in a wide-angle end state.

In the manufacturing method of the zoom lens according to the first present invention, each lens is disposed in the lens-barrel so that the following conditional expression is satisfied:

$$0.23<(TL5-WL5)/ft<1.20$$

however,
where WL5 denotes a distance on the optical axis from the surface closest to the object in the fifth lens group to the image surface in a wide-angle end state,
TL5 denotes a distance on the optical axis from the surface closest to the object in the fifth lens group to the image surface in a telephoto end state, and
ft denotes a focal length of the zoom lens in a telephoto end state.

In the manufacturing method of the zoom lens according to the first present invention, it is preferable to dispose each lens in a lens-barrel so that the following conditional expression is satisfied:

$$0.08<|(W45\beta-T45\beta)/(ft/fw)|$$

however,
where W45β denotes composed magnification regarding the fourth lens group and the fifth lens group in a wide-angle end state,
T45β denotes composed magnification regarding the fourth lens group and the fifth lens group in a telephoto end state,
ft denotes a focal length of the zoom lens in a telephoto end state, and
fw denotes a focal length of the zoom lens in a wide-angle end state.

A manufacturing method of a zoom lens according to a second present invention, the zoom lens comprises, in order along an optical axis from an object, a first lens group having a positive refractive power, a second lens group having a negative refractive power, a third lens group having a positive refractive power, a fourth lens group having a negative refractive power, and a fifth lens group having a positive refractive power, and distances between each lens group change when zooming, and the first lens group is composed of two lens, and each lens is disposed in a lens-barrel so that the following conditional expression is satisfied:

$$0.08<|(W45\beta-T45\beta)/(ft/fw)|$$

however,
where W45β denotes composed magnification regarding the fourth lens group and the fifth lens group in a wide-angle end state,
T45β denotes composed magnification regarding the fourth lens group and the fifth lens group in a telephoto end state,
ft denotes a focal length of the zoom lens in a telephoto end state, and
fw denotes a focal length of the zoom lens in a wide-angle end state.

Advantageous Effects of the Invention

According to the present invention, it is possible to provide a zoom lens, an optical apparatus, and a manufacturing method of the zoom lens which is thin and has outstanding optical performance.

BRIEF DESCRIPTION OF THE DRAWINGS

FIGS. 1A to 1C illustrate a sectional view showing a configuration of a zoom lens according to Example 1, where FIG. 1A depicts a location of each lens group in a wide-angle end state (W), FIG. 1B depicts that in an intermediate focal length state (M), and FIG. 1C depicts that in a telephoto end state (T).

FIGS. 2A to 2C illustrate graphs showing various aberrations of the zoom lens according to Example 1, where FIG. 2A depicts graphs showing various aberrations upon focusing on infinity in the wide-angle end state, FIG. 2B depicts those in the intermediate focal length state, and FIG. 2C depicts those in the telephoto end state.

FIGS. 3A to 3C illustrate a sectional view showing a configuration of a zoom lens according to Example 2, where FIG. 3A depicts a location of each lens group in a wide-angle end state, FIG. 3B depicts that in an intermediate focal length state, and FIG. 3C depicts that in a telephoto end state.

FIGS. 4A to 4C illustrate graphs showing various aberrations of the zoom lens according to Example 2, where FIG. 4A depicts various aberrations in the wide-angle end state, FIG. 4B depicts those in the middle focal length state, and FIG. 4C depicts those in the telephoto end state.

FIGS. 5A to 5C illustrate a sectional view showing a configuration of a zoom lens according to Example 3, where FIG. 5A depicts a location of each lens group in a wide-angle end state, FIG. 5B depicts that in an intermediate focal length state, and FIG. 5C depicts that in a telephoto end state.

FIGS. 6A to 6C illustrate graphs showing various aberrations according to Example 3, where FIG. 6A depicts graphs showing various aberrations upon focusing on infinity in the wide-angle end state, FIG. 6B depicts those in the intermediate focal length state, and FIG. 6C depicts those in the telephoto end state.

FIG. 8 is a sectional view along an arrow A-A' in FIG. 7A.

DESCRIPTION OF THE EMBODIMENTS

The First and Second Embodiments

Figure 2A:
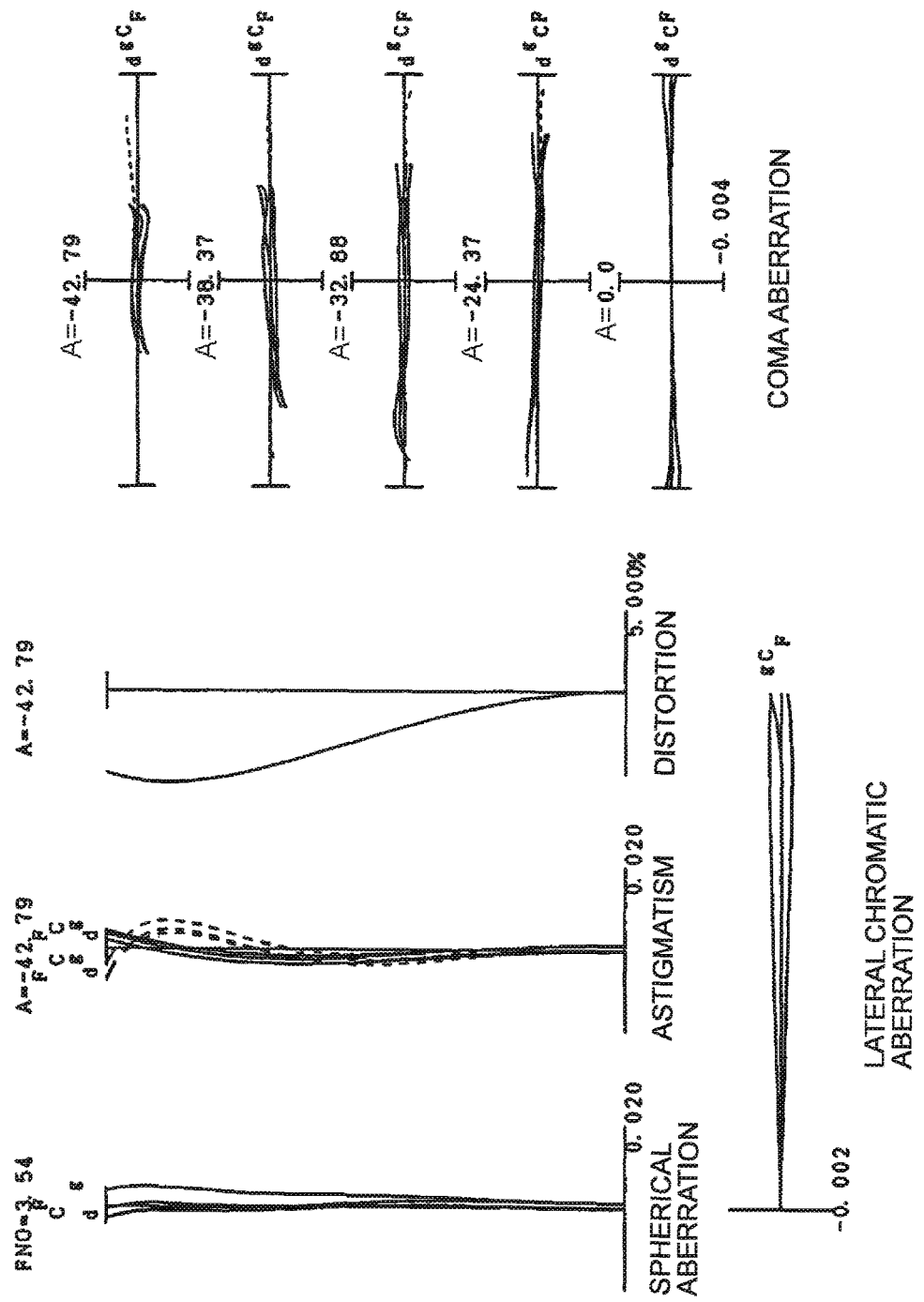

A first embodiment will be now described with reference to the drawings. The zoom lens ZL according to the first embodiment comprises, in order along an optical axis from an object as shown in FIGS. 1A to 1C, a first lens group G1 having a positive refractive power, a second lens group G2 having a negative refractive power, a third lens group G3 having a positive refractive power, a fourth lens group G4 having a negative refractive power, and a fifth lens group G5 having a positive refractive power, and distances between each lens group change when zooming from a wide-angle end state to a telephoto end state, and the first lens group G1 is composed of two lenses, and the following conditional expression (1) is satisfied:

$$0.07 < D1/fw < 0.46 \qquad (1)$$

however,
where D1 denotes a thickness on the optical axis of the first lens group G1, and
fw denotes a focal length of the zoom lens ZL in a wide-angle end state.

In the zoom lens ZL according to the first embodiment, it is possible to properly correct a fluctuation of a location of an image surface upon zooming with a configuration of changing the distances between each lens when zooming as mentioned above. Moreover, it is possible to reduce a thickness with the first lens group G1 composed of two lenses.

The conditional expression (1) defines a thickness of the first lens group G1. With the conditional expression (1) satisfied, it is possible to reduce spherical aberration, astigmatism and lateral chromatic aberration while attaining reducing a thickness of an optical system. When exceeding an upper limit value of the conditional expression (1), this causes unable to obtain a movement amount of the second lens group G2 and the third lens group G3 when zooming, and the refractive powers of the second lens group G2 and the third lens group G3 are needed to be raised, thus this leads difficulty to reduce a fluctuation of spherical aberration and astigmatism when zooming. When deceeding a lower limit of the conditional expression (1), this causes to increase quantities of lateral chromatic aberration and spherical aberration occurred in the first lens group G1, thus this leads difficulty to properly correct lateral chromatic aberration and spherical aberration especially in a telephoto end state.

In order to ensure the advantageous effect of the first embodiment, it is preferable to set the lower limit of the conditional expression (1) to 0.09. In order to ensure the advantageous effect of the first embodiment, it is preferable to set the lower limit of the conditional expression (1) to 0.11. In order to ensure the advantageous effect of the first embodiment, it is preferable to set the lower limit of the conditional expression (1) to 0.13.

In the zoom lens ZL according to the first embodiment, it is preferable that all the lens groups move on the optical axis when zooming. With this arrangement, it is possible to properly correct a fluctuation of a location of an image surface while reducing a diameter of the first lens group G1.

In the zoom lens ZL according to the first embodiment, it is preferable that a distance from a surface closest to the object side in the fifth lens group G5 to the image surface is larger in a telephoto end state than in a wide-angle end state. With this arrangement, it is possible to suppress a fluctuation of an exit pupil when zooming. Note that in case the distance from the surface closest to the object side in the fifth lens group G5 to the image surface is smaller in the telephoto end state than in the wide-angle end state, it is also possible to suppress the fluctuation of the exit pupil by moving other groups, however this causes difficulty to reduce fluctuation of a location of the image surface.

In the zoom lens ZL according to the first embodiment, it is preferable that the following conditional expression (2) is satisfied:

$$0.23 < (TL5-WL5)/ft < 1.20 \qquad (2)$$

however,
where WL5 denotes a distance on the optical axis from the surface closest to the object in the fifth lens group G5 to an image surface in a wide-angle end state,
TL5 denotes a distance on the optical axis from the surface closest to the object in the fifth lens group G5 to an image surface in a telephoto end state,
ft denotes a focal length of the zoom lens ZL in the telephoto end state.

The conditional expression (2) defines an amount of movement of the fifth lens group G5 from the wide-angle end state to the telephoto end state. By satisfying the conditional expression (2), it is possible to reduce curvature of the image surface and the fluctuation of the exit pupil upon zooming. When exceeding the upper limit of the conditional expression (2), the curvature of the image surface becomes larger, thus this leads difficulty to obtain a plane image surface. When deceeding the lower limit of the conditional expression (2), the curvature of the image surface becomes appropriate, however the fluctuation of the incident pupil becomes too large. At this point, when other lens groups move so as to reduce the fluctuation of the incident pupil, it becomes difficult to reduce the fluctuation of a location of the image surface, thus this is not appreciated since a lens becomes larger.

In order to ensure the advantageous effect of the first embodiment, it is preferable to set the upper limit of the conditional expression (2) to 1.00. In order to further ensure the advantageous effect of the first embodiment, it is preferable to set the upper limit of the conditional expression (2) to 0.80. In order to ensure the advantageous effect of the first embodiment, it is preferable to set the upper limit of the conditional expression (2) to 0.60.

In the zoom lens ZL according to the first embodiment, it is preferable that the first lens group G1 is composed of, in order from the object, a negative lens, and a positive lens. With this arrangement, it is possible to properly correct spherical aberration generated in the first lens group G1 while downsizing a diameter of the first lens group G1.

In the zoom lens ZL according to the first embodiment, it is preferable that the first lens group G1 is composed of a cemented lens composed of the two lenses. With this arrangement, it is possible to properly correct lateral chromatic aberration generated in the first lens group G1 while reducing a thickness on the optical axis of the first lens group G1.

In the zoom lens ZL according to the first embodiment, it is preferable that the second lens group G2 is composed of, in order from the object, a negative lens, a negative lens, and a positive lens. With this arrangement, it is possible to properly correct a fluctuation of astigmatism when zooming.

In the zoom lens ZL according to the first embodiment, it is preferable that the following conditional expression (3) is satisfied:

$$0.08 < |(W45\beta - T45\beta)/(ft/fw)| \qquad (3)$$

however,
where W45β denotes composed magnification regarding the fourth lens group G4 and the fifth lens group G5 in a wide-angle end state, T45β denotes composed magnification regarding the fourth lens group G4 and the fifth lens group G5 in a telephoto end state, ft denotes a focal length of the zoom lens ZL in a telephoto end state, and fw denotes a focal length of the zoom lens ZL in a wide-angle end state.

The conditional expression (3) defines an amount of composed magnification regarding the fourth lens group G4 and the fifth lens group G5 upon zooming from a wide-angle end state to a telephoto end state. By satisfying the conditional expression (3), it is possible to reduce spherical aberration and lateral chromatic aberration. When deceeding the lower limit of the conditional expression (3), the composed magnification regarding the fourth lens group G4 and the fifth lens group G5 in a telephoto end state does not sufficiently become large in comparison with the composed magnification regarding the fourth lens group G4 and the fifth lens group G5 in a wide-angle end state. Therefore, a zooming action of a group on the object size becomes larger than that in the fourth lens group G4, thus a total length of an optical system becomes too long. Here, when raising each refractive power of each group for downsizing, amounts of lateral chromatic aberration and aspherical aberration generated in the first lens group increased, and an amount of spherical aberration increases in the third lens group G3, thus it is difficult to properly correct these aberrations especially in the telephoto end state.

In order to ensure the advantageous effect of the first embodiment, it is preferable to set the upper limit of the conditional expression (3) to 0.50. In order to further ensure the advantageous effect of the first embodiment, it is preferable to set the upper limit of the conditional expression (3) to 0.40. With this arrangement, it is possible to properly correct coma aberration, etc.

According to the zoom lens ZL according to the first embodiment equipped with the above configurations, it is possible to realize a zoom lens which is thin and has outstanding optical performance.

Figure 7A:
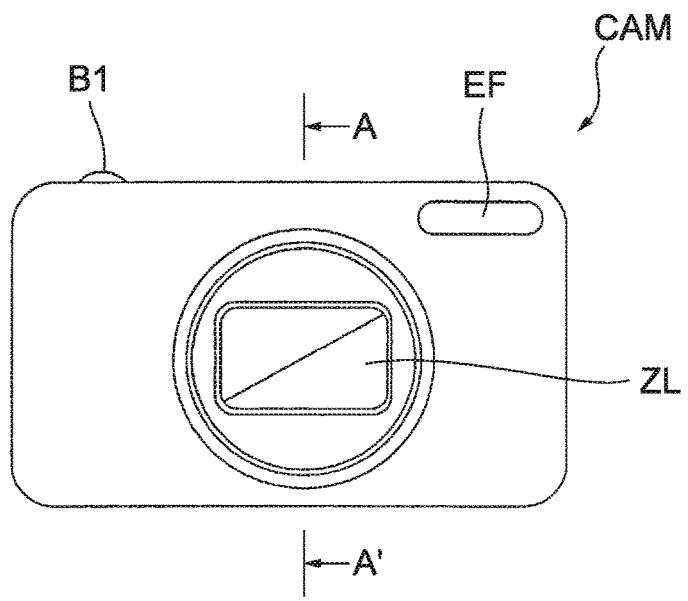
FIG. 7A is a front view of a digital still camera using the zoom lenses according to the first and second embodiments.
Figure 7B:
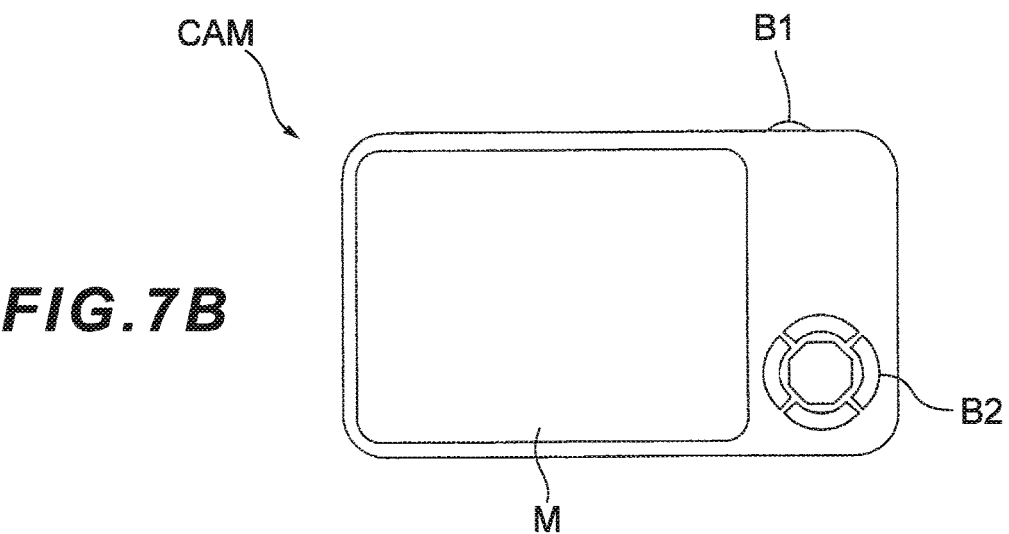
FIG. 7B is a rear view of this digital still camera.

FIGS. 7 and 8 illustrate a configuration of a digital still camera CAM (optical apparatus) as an optical apparatus equipped with the zoom lens ZL according to the first embodiment. In this digital still camera CAM, when a power button not illustrated is pressed, a shutter not illustrated of a photographing lens (zoom lens ZL) opens, light from a photographic subject (object) are collected with the zoom lens ZL, and this is imaged by an imaging element C (for instance, a CCD or a CMOS, etc.) disposed on an image surface I (refer to FIG. 1). The photographic subject image imaged by the imaging element C is displayed on a liquid crystal display monitor M provided behind the digital still camera CAM. A photographer photos, after deciding a composition of a photographic subject image while looking at the liquid crystal display monitor M, the photographic subject by the imaging element C by pressing a shutter release button B1, and records and stores it in a not illustrated memory.

The camera CAM is provided with a fill light flushing unit EF which emits fill light when a photographic subject is dark, and a function button B2, etc. used for setting various conditions, etc. of the digital still camera CAM. Although a compact type camera in which a camera CAM and a zoom lens ZL are fabricated together is exampled herewith, it is applicable to a single-lens reflex camera, as an optical apparatus, in which a lens-barrel having the zoom lens ZL is attachable and detachable with a camera body.

According to camera CAM according to the first embodiment equipped with the above configurations, by having the zoom lens ZL described above as a photographing lens, it is possible to realize a camera which is thin and has outstanding optical performance.

Figure 9:
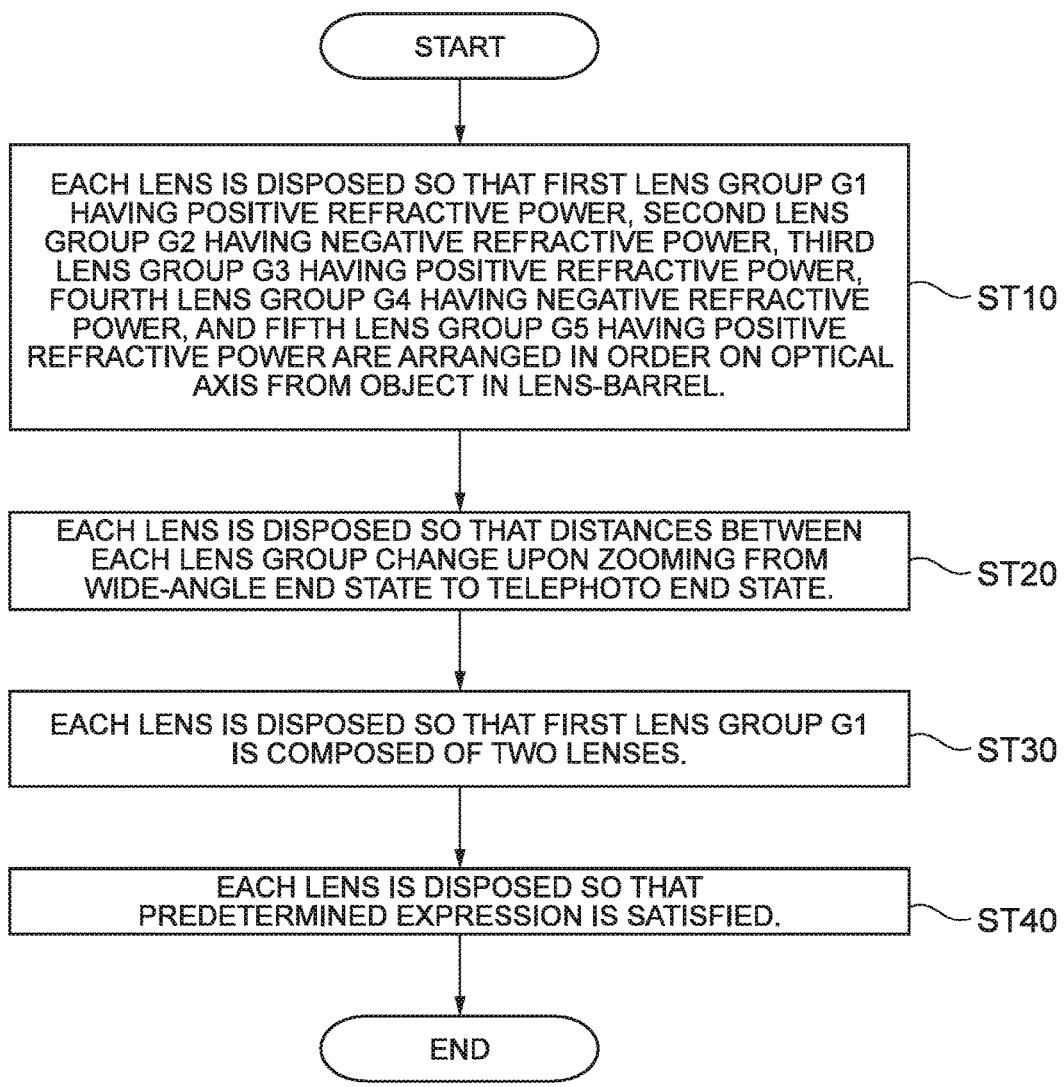
FIG. 9 is a flowchart showing manufacturing methods of zoom lenses according to the first and second embodiments.

Next, a manufacturing method of the zoom lens ZL according to the first embodiment is now explained referring to FIG. 9. Firstly, each lens is disposed in a manner of arranging, in order from an object on an optical axis, a first lens group having a positive refractive power, a second lens group having a negative refractive power, a third lens group having a positive refractive power, a fourth lens group having a negative refractive power, and a fifth lens group having a positive refractive power in a lens-barrel (Step ST10). At this point, each lens is arranged so that distances between each lens group change upon zooming from a wide-angle end state to a telephoto end state (Step ST20). In the first lens group G1 each lens is disposed in a lens-barrel so that this is composed of two lenses (Step ST30). Each lens is disposed in the lens-barrel so that the following conditional expression (1) is satisfied (Step ST40):

$$0.07<D1/fw<0.46 \qquad (1)$$

however, where D1 denotes a thickness on the optical axis of the first lens group G1, and fw denotes a focal length of the zoom lens ZL in a wide-angle end state.

In the manufacturing method of the zoom lens ZL according to the first embodiment, it is preferable that each lens is disposed in the lens-barrel so that a distance on the optical axis from a surface closest to the object in the fifth lens group G5 to an image surface is larger in a telephoto end than a wide-angle end state.

In the manufacturing method of the zoom lens ZL according to the first embodiment, it is preferable to arrange each lens in a lens-barrel so that the above-mentioned conditional expression (2) is satisfied.

In the manufacturing method of the zoom lens ZL according to the first embodiment, it is preferable that each lens is disposed in the lens-barrel so that the above-mentioned conditional expression (3) is satisfied.

Exampling lens arrangements according to the first embodiment, the zoom lens ZL illustrated in FIG. 1 incorporates one cemented lens, in a lens-barrel, composed of, as the first lens group G1 having a positive refractive power, in order along an optical axis from an object, a negative meniscus lens L11 having a convex surface facing the object, and a positive meniscus lens L12 having a convex surface facing the object. Each lens is incorporated in the lens-barrel so that, as the second lens group G2 having a negative refractive power, a negative meniscus lens L21 having a convex surface facing the object, a biconcave negative lens L22, and a positive meniscus lens L23 having a convex surface facing the object are arranged in order along the optical axis from the object. Each lens is incorporated in the lens-barrel so that, as the third lens group G3 having a positive refractive power, a positive meniscus lens L31 having a convex surface facing the object, a cemented lens composed of a biconvex positive lens L32 and a biconcave negative lens L33 are arranged in order along the optical axis from the object. A biconcave negative lens L41 is incorporated in the lens-barrel as the fourth lens group G4 having a negative refractive power. A positive meniscus lens L51 having a positive refractive power is incorporated in the lens-barrel as the fifth lens group G5 having a positive refractive power. Each lens is incorporated in the lens-barrel so that the conditional expression (1) is satisfied (the corresponding value of the conditional expression (1) is 0.454).

According to the manufacturing method of the zoom lens ZL set forth in the first embodiment, it is possible to manufacture a zoom lens which is thin and has outstanding optical performance.

Next, the second embodiment is described with reference to the drawings. The zoom lens ZL according to the second embodiment comprises, in order on an optical axis from an object, a first lens group G1 having a positive refractive power, a second lens group G2 having a negative refractive power, a third lens group G3 having a positive refractive power, a fourth lens group G4 having a negative refractive power, and a fifth lens group G5 having a positive refractive power, and distances between each lens group change upon zooming from a wide-angle end state to a telephoto end state, and the first lens group G1 is composed of two lenses, and the following conditional expression (3) is satisfied:

$$0.08<|(W45\beta-T45\beta)/(ft/fw)| \qquad (3)$$

however,
where W45β denotes composed magnification regarding the fourth lens group G4 and the fifth lens group G5 in the wide-angle end state, T45β denotes composed magnification regarding the fourth lens group G4 and the fifth lens group G5 in the telephoto end state,
ft denotes a focal length of the zoom lens ZL in the telephoto end state, and
fw denotes a focal length of the zoom lens ZL in the wide-angle end state.

In the zoom lens ZL according to the second embodiment, with a configuration in which the distances between each lens change when zooming, it is possible to properly correct a fluctuation of a location of an image surface when zooming. Moreover, it is possible to make it thin with the first lens group G1 composed of two lens.

The conditional expression (3) defines an amount of change of composed magnification regarding the fourth lens group G4 and the fifth lens group G5 upon zooming from the wide-angle end state to the telephoto end state. With the conditional expression (3) satisfied, it is possible to reduce spherical aberration and lateral chromatic aberration. When deceeding the lower limit of the conditional expression (3), composed magnification regarding the fourth lens group G4 and the fifth lens group G5 in the telephoto end state will not become large sufficiently in comparison with the composed magnification regarding the fourth lens group G4 and the fifth lens group G5 in the wide-angle end state. Therefore, a zooming action of a group on the object side becomes larger than that of the fourth lens group G4, thus a total length of an optical system becomes too long. Here, when raising a refractive power of each group for downsizing, amounts of generated lateral chromatic aberration and astigmatism increase in the first lens group G1, an amount of spherical aberration increase in the third lens group G3, thus it becomes difficult to properly correct those aberrations especially in the telephoto end state.

In order to ensure the advantageous effect of the second embodiment, it is preferable to set the upper limit of the conditional expression (3) to 0.50. In order to further ensure the advantageous effect of the second embodiment, it is preferable to set the upper limit of the conditional expression (3) to 0.40. With this arrangement, it is possible to properly correct coma aberration, etc.

According to the zoom lens ZL set forth in the second embodiment equipped with the above configurations, it is possible to realize a zoom lens which is thin and has outstanding optical performance.

FIGS. 7 and 8 illustrate configurations of a digital still camera CAM (optical apparatus) as an optical apparatus equipped with the zoom lens ZL according to the second embodiment. This digital still camera CAM has the same configurations as that of the first embodiment, and since that configuration has already been described, thus explanations thereof are now omitted.

According to the camera CAM set forth in the second embodiment equipped with the above configurations, this has the above-mentioned zoom lens ZL as a photographing lens, thus it is possible to realize a camera which is thin and has outstanding optical performance.

Next, referring to FIG. 9, a manufacturing method of the zoom lens ZL according to the second embodiment is explained. Firstly, each lens is disposed so that the first lens group G1 having a positive refractive power, the second lens group G2 having a negative refractive power, the third lens group G3 having a positive refractive power, and the fourth lens G4 having a negative refractive power, the fifth lens group having a positive refractive power are arranged in order along the optical axis from the object in a lens-barrel (Step ST10). Here, each lens is disposed so that the distances between each lens group change upon zooming from the wide-angle end state to the telephoto end state (Step ST20). In the first lens group G1 each lens is arranged in the lens-barrel so that this is composed of two lenses (Step ST30). Each lens is disposed in the lens-barrel so that the following conditional expression (3) is satisfied (Step ST40):

$$0.08<|(W45\beta-T45\beta)/(ft/fw)| \qquad (3)$$

however,
where W45β denotes composed magnification regarding the fourth lens group G4 and the fifth lens group G5 in the wide-angle end state,
T45β denotes composed magnification regarding the fourth lens group G4 and the fifth lens group G5 in the telephoto end state,
ft denotes a focal length of the zoom lens ZL in the telephoto end state, and
fw denotes a focal length of the zoom lens ZL in the wide-angle end state.

Exampling lens arrangements according to the second embodiment, the zoom lens ZL illustrated in FIGS. 1A to 1C incorporates, as the first lens group G1 having a positive refractive power, in order along the optical axis from the object, one cemented lens composed of a negative meniscus lens L11 having a convex surface facing the object, and a positive meniscus lens L12 having a convex surface facing the object, in the lens-barrel. Each lens is incorporated in the lens-barrel so that, as the second lens group G2 having a negative refractive power, a negative meniscus lens L21 having a convex surface facing the object, a biconcave negative lens L22, and a positive meniscus lens L23 having a convex surface facing the object are arranged in order along the optical axis from the object. Each lens is incorporated in the lens-barrel so that a positive meniscus lens L31 having a convex facing the object, a cemented lens composed of a biconvex positive lens L32 and a biconcave negative lens L33, and a biconvex positive lens L34 are arranged in order along the optical axis from the object. As the fourth lens group G4 having a negative refractive power, a biconcave negative lens L41 is incorporated in the lens-barrel. As the fifth lens group G5 having a positive refractive power, a positive meniscus lens L51 having a convex surface facing the object is incorporated in the lens-barrel. Each lens is incorporated in the lens-barrel so that the conditional expression (3) is satisfied (the corresponding value of the conditional expression (3) is 0.194).

According to the manufacturing method of the zoom lens ZL set forth in the second embodiment, it is possible to manufacture a zoom lens which is thin and has outstanding optical performance.

Examples According to the First and Second Embodiments

Each example which according to the first and second embodiments are now described with reference to the drawings. Although Table 1 to Table 3 are shown below, these are tables of each data in Example 1 to Example 3.

Note that each reference sign to FIGS. 1A to 1C according to Example 1 is independently used for each example in order to avoid complicated explanations due to increasing the digit number of reference signs. Therefore, even if referred to the same reference sings shared with other drawings according to other examples, this does not necessarily mean they are the same configurations of the other examples.

In each example, as calculation targets of aberration characteristics, C-line (wave length of 656.2730 nm), d-line (wave length of 587.5620 nm), F-line (wave length of 486.1330 nm), and g-line (wave length of 435.8350 nm) are selected.

In [Lens Data] in tables, a surface number means an order of an optical surface from the object side along a direction in which a ray travels, R means a radius of curvature of each optical surface, D means a distance to the next lens surface, which is a distance on the optical axis from each optical surface to the next optical surface (or an image surface), nd means a reflective index to d-line of material of an optical member, and v d means an Abbe number on the basis of the d-line of material of the optical member. An object surface means a surface of an object, (variable) means a variable distance to the next lens surface, "∞" means a plane or an aperture, (stop S) means an aperture stop S, and an image surface means an image surface I. The refractive index of an air "1.00000" is omitted. In case that an optical surface has an aspherical surface, an * sign is given to the surface number, and a paraxial radius of curvature is illustrated in columns of the radius of curvature R.

In [Aspherical surface data] in tables, regarding the aspherical surface shown in [Lens Data], its configuration is indicated with the following conditional expression (a). X(y) means a distance along the optical axis from a tangent plane in a vertex of an aspherical surface to a location on the aspherical surface in height y, R means a radius of curvature (paraxial radius of curvature) of a standard spherical surface, κ means a cone constant, and Ai means an i-th aspherical surface coefficient. "E-n" indicates "×10$^{-n}$." For instance, 1.234E-05 is equal to $1.234 \times 10^{-5}$.

$$X(y)=(y^2/R)/\{1+(1-\kappa \times y^2/R^2)^{1/2}\}+A4 \times y^4+A6 \times y^6+A8 \times y^8+A10 \times y^{10} \quad (a)$$

In [General Data] in tables, f means a focal length of the lens whole system, Fno means a F number, ω means a half angle of view (maximum incident angle, unit: degree), Y means an image height, BF means a back focus (what is carried out by performing air equivalent of a distance from a lens rear end surface to a paraxial image surface on the optical axis), and TL means a total lens length (what is added with BF to a distance from a lens front end surface to a lens rear end surface on the optical axis).

[Zooming data] in tables show values Di of a variable distance in each state such as a wide-angle end, an intermediate focal length, or a telephoto end. Note that Di indicates a variable distance between the i-th surface and the (i+1)-th surface.

In [Zoom Lens Group Data] in tables, G means a group number, a group first surface means a surface number closest to an object of each group, a group focal length means a focal length of each group, and a lens configuration length means a distance on the optical axis from a lens surface closest to the object in each group to a lens surface closest to the image.

[Conditional Expression] in tables shows values corresponding to the conditional expressions (1) to (3).

Hereinafter, in all general data values, regarding the focal length f shown, a radius of curvature R, a distance to the next lens surface D, and other lengths, etc. "mm" is generally used except a specific request, however a zoom lens is not limited to the above, since equivalent optical performance can be obtained even if the zoom lens is proportionally enlarged or proportionally shrunk. Moreover, the unit is not limited to "mm," another appropriate unit can be used instead.

The explanations concerning the tables are common among all the examples, thus hereinafter the explanations are omitted.

Example 1

Example 1 is explained using FIGS. 1A to 1C and 2A to 2C, and Table 1. The zoom lens ZL (ZL1) according to Example 1 is composed of, in order along an optical axis from an object as shown in FIGS. 1A to 1C, a first lens group G1 having a positive refractive power, a second lens group G2 having a negative refractive power, an aperture stop S aiming at adjusting an amount of light, a third lens group G3 having a positive refractive power, and a fourth lens group G4 having a negative refractive power, a fifth lens group having a positive refractive power, and a filter group FL.

The first lens group G1 is composed of a cemented lens composed of, in order along the optical axis from the object, a negative meniscus lens L11 having a convex surface facing the object and a positive meniscus lens L12 having a convex surface facing the object.

The second lens group G2 is composed of, in order on the optical axis from the object, a negative meniscus lens L21 having a convex surface facing the object, a biconcave negative lens L22, a positive meniscus lens L23 having a convex surface facing the object. Note that an aspherical surface is formed on both side surfaces of the biconcave negative lens L22.

The third lens group G3 is composed of, in order along the optical axis from the object, a positive meniscus lens L31 having a convex surface facing the object, a cemented lens composed of a biconvex positive lens L32 and a biconcave negative lens L33, and a biconvex positive lens L34. Note that an aspherical surface is formed on both side surfaces of the positive meniscus lens L31 having the convex surface facing the object. Moreover, an aspherical surface is formed on an image side surface of the biconvex positive lens L34.

The fourth lens group G4 is composed of a biconcave negative lenses L41. Note that an aspherical surface is formed on both side surfaces of the biconcave negative lens L41.

The fifth lens group G5 is composed of a positive meniscus lenses L51 having a convex surface facing the object.

The filter group FL is composed of a low pass filter, an infrared cut filter, etc. for cutting spatial frequency more than marginal resolution of a solid-state image sensing device, such as a CCD disposed on the image surface I.

In the zoom lens ZL1 according to the present example, all the lens groups from the first lens group G1 to the fourth lens group G4 move upon zooming from a wide-angle end state to a telephoto end state so that distances between each lens group change. Specifically speaking, the first lens group G1 moves to the object side. The second lens group G2 once moves to the image surface side, and afterwards moves to the object side. The third lens group G3 moves to the object side. The fourth lens group G4 moves to the object side. The fifth lens group G5 once moves to the object side, and afterwards moves to the image surface side. The aperture stop S moves to the object side together with the third lens group G3.

Values of each data in Example 1 are shown in Table 1 below. The surface numbers 1 to 25 in Table 1 correspond to each optical surface of m1 to m25 indicated in FIGS. 1A to 1C.

TABLE 1

[Lens Data]

| Surface number | R | D | nd | νd |
|---|---|---|---|---|
| Object surface | ∞ | | | |
| 1 | 2.7306 | 0.0728 | 1.846663 | 23.78 |
| 2 | 2.0783 | 0.3813 | 1.696800 | 55.52 |
| 3 | 15.1698 | D3(variable) | | |
| 4 | 3.7389 | 0.0607 | 1.816000 | 46.59 |
| 5 | 0.6576 | 0.4915 | | |
| 6* | −2.0572 | 0.1214 | 1.618000 | 63.34 |
| 7* | 12.1359 | 0.0516 | | |
| 8 | 1.5528 | 0.1173 | 1.922860 | 20.88 |
| 9 | 3.8023 | D9(variable) | | |
| 10 | ∞ | 0.0910 | (stop S) | |
| 11* | 1.0879 | 0.1820 | 1.697200 | 53.29 |
| 12* | 2.5168 | 0.0061 | | |
| 13 | 0.7136 | 0.1820 | 1.496997 | 81.61 |
| 14 | −2.4934 | 0.0373 | 1.903658 | 31.31 |
| 15 | 1.7027 | 0.0375 | | |
| 16 | 2.2109 | 0.1181 | 1.593190 | 67.90 |
| 17* | −1.2592 | D17(variable) | | |
| 18* | −1.1103 | 0.0910 | 1.589130 | 61.22 |
| 19* | 12.1359 | D19(variable) | | |
| 20 | 2.7306 | 0.1006 | 1.593190 | 67.90 |
| 21 | 6.0680 | D21(variable) | | |
| 22 | ∞ | 0.0425 | 1.516800 | 63.88 |
| 23 | ∞ | 0.0910 | | |
| 24 | ∞ | 0.0425 | 1.516800 | 63.88 |
| 25 | ∞ | 0.0303 | | |
| Image surface | ∞ | | | |

[Aspheric Surface Data]

| Surface number | κ | A4 | A6 | A8 | A10 |
|---|---|---|---|---|---|
| 6 | 1.0 | 4.7944E−01 | −1.4666E+00 | 1.8528E+00 | −1.3866E+00 |
| 7 | 1.0 | 4.3981E−01 | −1.3992E+00 | 1.1351E+00 | 0.0000E+00 |
| 11 | 1.0 | 5.1446E−01 | 7.1881E−01 | −1.1913E+00 | 1.0246E+01 |
| 12 | 1.0 | 6.7035E−01 | 2.8314E−01 | 0.0000E+00 | 0.0000E+00 |
| 17 | 1.0 | 7.1443E−01 | 8.8606E−01 | 0.0000E+00 | 0.0000+00 |
| 18 | 1.0 | 5.1113E+00 | −3.0659E+01 | 1.2990E+02 | −3.1106E+02 |
| 19 | 1.0 | 4.8193E+00 | −2.3742E+01 | 8.5698E+01 | −1.6826E+02 |

[General Data]
Zoom ratio 3.305

| | Wide-angle end | Intermediate focal point | Telephoto end |
|---|---|---|---|
| f | 1.00000 | 2.12379 | 3.30461 |
| FNo | 3.54324 | 4.81965 | 5.66506 |
| ω | 42.79279 | 21.66324 | 14.26296 |
| Y | 0.880 | 0.880 | 0.880 |
| Bf | 0.85900 | 1.97261 | 1.92544 |
| TL | 4.882 | 5.579 | 6.653 |

TABLE 1-continued

| [Zooming Data] | | | |
|---|---|---|---|
| Variable distance | Wide-angle end | Intermediate focal point | Telephoto end |
| D3 | 0.03068 | 0.77566 | 1.42774 |
| D9 | 1.08005 | 0.30775 | 0.09204 |
| D17 | 0.25662 | 0.15660 | 0.12136 |
| D19 | 0.51264 | 0.22404 | 0.94421 |
| D21 | 0.68196 | 1.79524 | 1.74808 |

| [Zoom Lens Group Data] | | | |
|---|---|---|---|
| Group number | Group first surface | Group Focal Length | Lens configuration length |
| G1 | 1 | 5.10381 | 0.4541 |
| G2 | 4 | −1.04134 | 0.8424 |
| G3 | 11 | 0.97519 | 0.6541 |
| G4 | 18 | −1.72232 | 0.9100 |
| G5 | 20 | 8.27662 | 0.1006 |

[Conditional expression]

Conditional expression(1)D1/fw = 0.454
Conditional expression(2)(TL5 − WL5)/ft = 0.323
Conditional expression(3)|(W45β − T45β)/(ft/fw)| = 0.194

As shown in Table 1, it is understandable that the conditional expressions (1) to (3) are satisfied regarding the zoom lens ZL1 according to the present example.

Figure 2C:
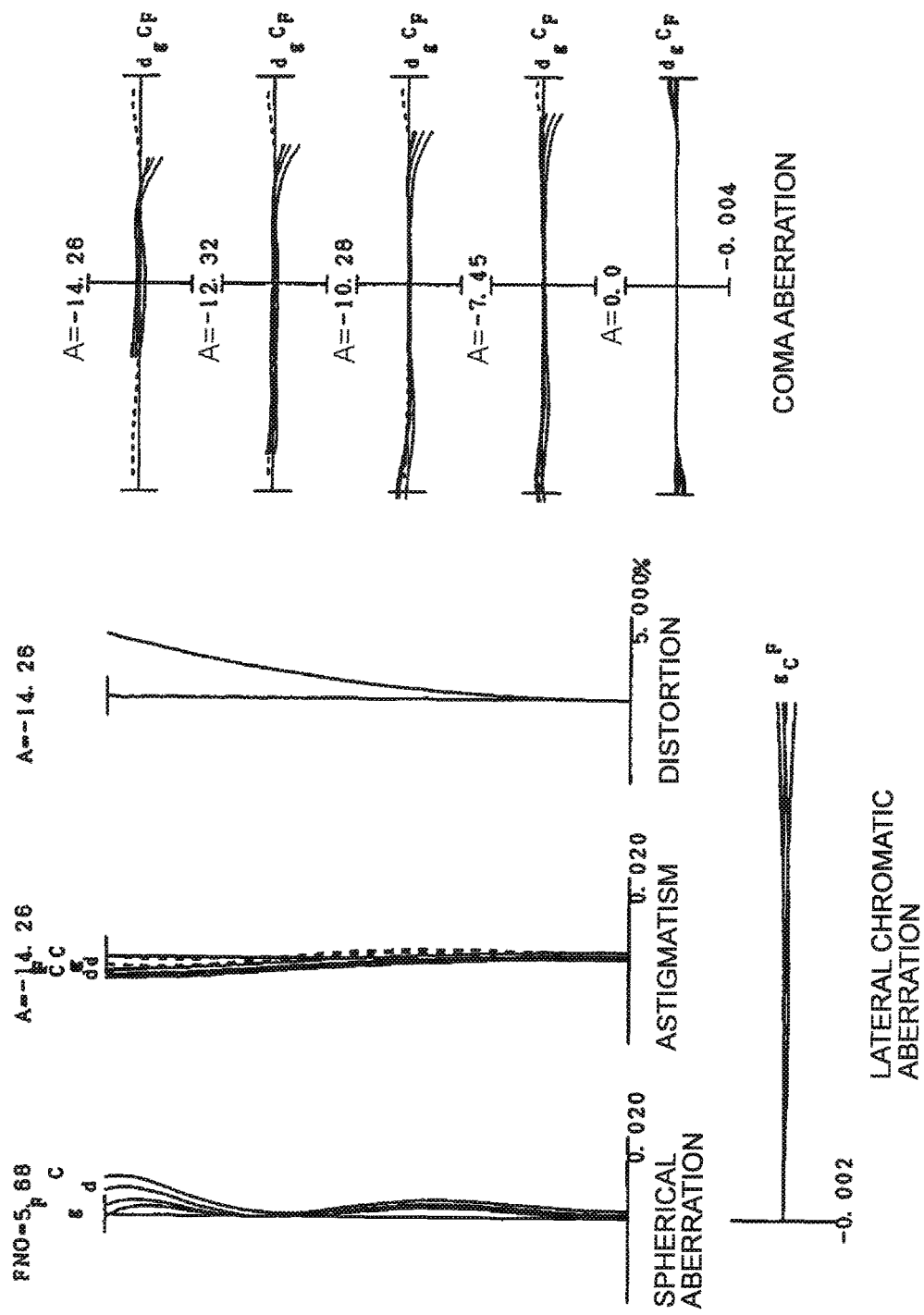

FIG. 2A to 2C illustrate graphs showing various aberrations (spherical aberration, astigmatism, distortion aberration, coma aberration, and lateral chromatic aberration) of zoom lens ZL1 according to Example 1. FIG. 2A illustrates graphs showing various aberrations upon focusing on infinity in the wide-angle end state of the present example, FIG. 2B illustrates graphs showing various aberrations upon focusing on infinity in the intermediate focal length state of the present example, and FIG. 2C illustrates graphs showing various aberrations upon focusing on infinity in the telephoto end state of the present example.

In each graph showing aberration, FNO means a F number, and A means a half angle of view against each image height (unit: degree). d means d-line, g means g-line, C means C-line, and F means aberration in F-line. Moreover, what is not described means aberration according to d-line. In graphs showing astigmatism, a solid line indicates a sagittal image plane and a dashed line indicates a meridional image plane. Note that also in graphs showing aberration of each example described below, the same signs are used as those in the present example.

As is obvious in each graph showing aberrations illustrated in FIGS. 2A to 2C, in the zoom lens ZL1 according to Example 1, it is understandable that various aberrations are properly corrected, and this has outstanding optical performance.

Example 2

Example 2 is explained using FIGS. 3A to 3C and 4A to 4C, and Table 2. The zoom lens ZL (ZL2) according to Example 2 is composed of, in order along an optical axis from an object as shown in FIGS. 3A to 3C, a first lens group G1 having a positive refractive power, a second lens group G2 having a negative refractive power, an aperture stop S aiming at adjusting an amount of light, a third lens group G3 having a positive refractive power, a fourth lens group G4 having a negative refractive power, a fifth lens group G5 having a positive refractive power, and a filter group FL.

The first lens group G1 is composed of, in order along the optical axis from the object, a cemented lenses composed of a negative meniscus lens L11 having a convex surface facing the object and a positive meniscus lens L12 having a convex surface facing the object.

The second lens group G2 is composed of, in order along the optical axis from the object, a negative meniscus lens L21 having a convex surface facing the object, a biconcave negative lens L22, and a positive meniscus lens L23 having a convex surface facing the object. Note that an aspherical surface is formed in both side surface of the biconcave negative lens L22.

The third lens group G3 is composed of, in order along the optical axis from the object, a biconvex positive lens L31, a cemented lens composed of a biconvex positive lens L32 and a biconcave negative lens L33, and a biconvex positive lens L34. Note that an aspherical surface is formed on both side surfaces of the biconvex positive lens L31. Moreover, an aspherical surface is formed on the image side surface of the biconvex positive lens L34.

The fourth lens group G4 is composed of a biconcave negative lenses L41. Note that an aspherical surface is formed on both side surfaces of the biconcave negative lens L41.

The fifth lens group G5 is composed of a positive meniscus lenses L51 having a convex surface facing the object.

The filter group FL is composed of a low pass filter, an infrared cut-off filter, etc. for cutting the spatial frequency more than marginal dissectors of a solid-state image sensing device, such as a CCD disposed by the image surface I.

In the zoom lens ZL2 according to the present example, all the lens groups from the first lens group G1 to the fifth lens group G5 move so that distances between each lens group change upon zooming from a wide-angle end state to a telephoto end state. Specifically speaking, the first lens group G1 moves to the object side. The second lens group G2 once moves to the image surface side, and afterwards moves to the object side. The third lens group G3 moves to the object side. The fourth lens group G4 moves to the object side. The fifth lens group G5 once moves to the object side, and afterwards moves to the image surface side. The aperture stop S moves to the object side together with the third lens group G3.

Values of each data in Example 2 are shown in Table 2 below. The surface numbers 1 to 25 in Table 2 correspond to each optical surface of m1 to m25 shown in FIGS. 3A to 3C.

TABLE 2

[Lens Data]

| Surface number | R | D | nd | νd |
|---|---|---|---|---|
| Object surface | ∞ | | | |
| 1 | 2.5127 | 0.0632 | 1.846663 | 23.78 |
| 2 | 1.8183 | 0.3023 | 1.696800 | 55.52 |
| 3 | 16.6805 | D3(variable) | | |
| 4 | 2.8435 | 0.0526 | 1.816000 | 46.59 |
| 5 | 0.5972 | 0.4737 | | |
| 6* | −10.5263 | 0.1053 | 1.618000 | 63.34 |
| 7* | 1.4871 | 0.0125 | | |
| 8 | 1.7750 | 0.1316 | 1.922860 | 20.88 |
| 9 | 8.5638 | D9(variable) | | |
| 10 | ∞ | 0.0790 | (stop S) | |
| 11* | 0.9461 | 0.1842 | 1.697200 | 53.29 |
| 12* | −16.0370 | 0.0725 | | |
| 13 | 1.2079 | 0.1809 | 1.496997 | 81.61 |
| 14 | −1.5812 | 0.0316 | 1.903658 | 31.31 |
| 15 | 1.6902 | 0.0940 | | |
| 16 | 4.1902 | 0.1316 | 1.593190 | 67.90 |
| 17* | −1.2873 | D17(variable) | | |
| 18* | −1.7526 | 0.0790 | 1.589130 | 61.22 |
| 19* | 10.5263 | D19(variable) | | |
| 20 | 2.3684 | 0.1547 | 1.593190 | 67.90 |
| 21 | 5.2632 | D21(variable) | | |
| 22 | ∞ | 0.0368 | 1.516800 | 63.88 |
| 23 | ∞ | 0.0790 | | |
| 24 | ∞ | 0.0368 | 1.516800 | 63.88 |
| 25 | ∞ | 0.0303 | | |
| Image surface | ∞ | | | |

[Aspheric Surface Data]

| Surface number | κ | A4 | A6 | A8 | A10 |
|---|---|---|---|---|---|
| 6 | 1.0 | −9.4851E−01 | 2.6113E+00 | −6.0231E+00 | 4.0371E+00 |
| 7 | 1.0 | −1.0737E+00 | 3.0376E+00 | −8.4959E+00 | 9.5788E+00 |
| 11 | 1.0 | 7.5212E−02 | 4.0353E−01 | −1.3972E+00 | 7.7232E+00 |
| 12 | 1.0 | 1.1705E−01 | 1.9457E−01 | −7.6884E−01 | 4.9478E+00 |
| 17 | 1.0 | 6.8208E−01 | −1.1266E−01 | −4.8349E−01 | 1.4618E+01 |
| 18 | 1.0 | 2.8176E+00 | −1.4255E+01 | 3.8274E+01 | −4.2729E+01 |
| 19 | 1.0 | 2.5863E+00 | −1.1440E+01 | 2.7721E+01 | −2.1578E+01 |

[General data]
Zoom ratio 3.063

| | Wide-angle end | Intermediate focal point | Telephoto end |
|---|---|---|---|
| f | 1.00000 | 1.55263 | 3.06315 |
| FNo | 2.87832 | 4.47291 | 5.88068 |
| ω | 38.77022 | 25.26713 | 13.50965 |
| Y | 0.763 | 0.763 | 0.763 |
| Bf | 0.58300 | 1.51859 | 2.40412 |
| TL | 4.853 | 5.210 | 6.282 |

[Zooming data]

| Variable distance | Wide-angle end | Intermediate focal point | Telephoto end |
|---|---|---|---|
| D3 | 0.05065 | 0.54431 | 1.25342 |
| D9 | 1.01510 | 0.54351 | 0.15331 |
| D17 | 0.29027 | 0.21944 | 0.10526 |
| D19 | 0.76589 | 0.23535 | 0.21726 |
| D21 | 0.42908 | 1.36475 | 2.25028 |

TABLE 2-continued

[Zoom Lens Group Data]

| Group number | Group first surface | Group focal length | Lens configuration length |
|---|---|---|---|
| G1 | 1 | 4.62753 | 0.3655 |
| G2 | 4 | −0.86259 | 0.7756 |
| G3 | 11 | 1.06779 | 0.7736 |
| G4 | 18 | −2.54423 | 0.0790 |
| G5 | 20 | 7.11777 | 0.1547 |

[Conditional expression]

Conditional expression(1)D1/fw = 0.365
Conditional expression(2)(TL5 − WL5)/ft = 0.595
Conditional expression(3)|(W45β − T45β)/(ft/fw)| = 0.081

Based on Table 2, the conditional expressions (1) to (3) are satisfied regarding the zoom lens ZL2 according to the present example.

FIGS. 4A, 4B and 4C illustrate graphs showing various aberrations (spherical aberration, astigmatism, distortion aberration, coma aberration, and lateral chromatic aberration) of zoom lens according to Example 2. FIG. 4A illustrates graphs showing various aberrations upon focusing on infinity in the wide-angle end state of the present example, FIG. 4B illustrates graphs showing various aberrations upon focusing on infinity in the intermediate focal length state of the present example, and FIG. 4C illustrates graphs showing various aberrations upon focusing on infinity in the telephoto end state.

As is obvious in each graph showing aberrations illustrated in FIGS. 4A to 4C, in the zoom lens ZL2 according to Example 2, it is understandable that various aberrations are properly corrected, and this has outstanding optical performance.

Example 3

Example 3 is explained using FIGS. 5A to 5C and 6A to 6C, and Table 3. The zoom lens ZL (ZL3) according to Example 3 is composed of, in order along an optical axis from an object as shown in FIGS. 5A to 5C, a first lens group G1 having a positive refractive power, a second lens group G2 having a negative refractive power, an aperture stop S aiming at adjusting an amount of light, a third lens group G3 having a positive refractive power, a fourth lens group G4 having a negative refractive power, a fifth lens group having a positive refractive power, and a filter group FL.

The first lens group G1 is composed of, in order along the optical axis from the object, a cemented lenses composed of a negative meniscus lens L11 having a convex surface facing the object and a biconvex positive lens L12.

The second lens group G2 is composed of, in order along the optical axis from the object, a negative meniscus lens L21 having a convex surface facing the object, a biconcave negative lens L22, and a positive meniscus lens L23 having a convex surface facing the object. Note that an aspherical surface is formed on the image side surface of the negative meniscus lens L21 having the convex surface facing the object.

The third lens group G3 is composed of, in order along the optical axis from the object, a positive meniscus lens L31 having a convex surface facing the object, a cemented lens composed of a biconvex positive lens L32 and a biconcave negative lens L33, and a biconvex positive lens L34. Note that an aspherical surface is formed on both side surfaces of the positive meniscus lens L31 having the convex surface facing the object. Moreover, an aspherical surface is formed on the image side surface of the biconvex positive lens L34.

The fourth lens group G4 is composed of a biconcave negative lenses L41. Note that an aspherical surface is formed on both side surfaces of the biconcave negative lens L41.

The fifth lens group G5 is composed of a positive meniscus lenses L51 having a convex surface facing the object.

The filter group FL is composed of a low pass filter, an infrared cut filter, etc. for cutting a spatial frequency more than marginal resolution of a solid-state image sensing device, such as a CCD disposed on the image surface I.

In the zoom lens ZL3 according to the present example, all the lens groups from the first lens group G1 to the fourth lens group G5 move upon zooming from the wide-angle end state to the telephoto end state so that distances between each lens group change. Specifically speaking, the first lens group G1 moves to the object side. The second lens group G2 once moves to the image surface side, and afterwards moves to the object side. The third lens group G3 moves to the object side. The fourth lens group G4 moves to the object side. The fifth lens group G5 once moves to the object side, and afterwards moves to the image surface side. The aperture stop S moves to the object side together with the third lens group G3.

Values of each data in Example 3 are shown in Table 3 below. The surface numbers 1 to 25 in Table 3 correspond to each optical surface of m1 to m25 which are shown in FIGS. 5A to 5C.

TABLE 3

[Lens Data]

| Surface number | R | D | nd | vd |
|---|---|---|---|---|
| Object Surface | ∞ | | | |
| 1 | 3.4055 | 0.0291 | 1.922860 | 20.88 |
| 2 | 1.8706 | 0.1054 | 1.883000 | 40.66 |

TABLE 3-continued

| | | | | |
|---|---|---|---|---|
| 3 | −8.6752 | D3(variable) | | |
| 4 | 4.2131 | 0.0364 | 1.816000 | 46.59 |
| 5 | 0.6642 | 0.2000 | | |
| 6* | −1.0612 | 0.0727 | 1.618000 | 63.34 |
| 7* | 7.2726 | 0.0364 | | |
| 8 | 0.9209 | 0.0621 | 1.922860 | 20.88 |
| 9 | 1.6374 | D9(variable) | | |
| 10 | ∞ | 0.0545 | (stop S) | |
| 11* | 0.6296 | 0.1084 | 1.697200 | 53.29 |
| 12* | −7.0731 | 0.0036 | | |
| 13 | 0.8007 | 0.1091 | 1.496997 | 81.61 |
| 14 | −1.3105 | 0.0364 | 1.903658 | 31.31 |
| 15 | 1.3795 | 0.1091 | | |
| 16 | 3.6363 | 0.0727 | 1.593190 | 67.90 |
| 17* | −0.7884 | D17(variable) | | |
| 18* | −0.7782 | 0.0545 | 1.589130 | 61.22 |
| 19* | 1.0909 | D19(variable) | | |
| 20 | 1.2692 | 0.1455 | 1.618000 | 63.34 |
| 21 | 3.6363 | D21(variable) | | |
| 22 | ∞ | 0.0255 | 1.516800 | 63.88 |
| 23 | ∞ | 0.0545 | | |
| 24 | ∞ | 0.0255 | 1.516800 | 63.88 |
| 25 | ∞ | 0.0182 | | |
| Image surface | ∞ | | | |

[Aspherical Surface Data]

| Surface number | κ | A4 | A6 | A8 | A10 |
|---|---|---|---|---|---|
| 6 | 1.0 | 2.4187E−01 | −2.2760E+00 | 2.5912E+01 | −1.0907E+02 |
| 7 | 1.0 | 6.3257E−01 | −6.1931E−01 | 7.8691E+00 | 0.0000E+00 |
| 11 | 1.0 | 5.9853E−01 | 1.7723E+00 | 5.9018E+00 | 3.7762E+01 |
| 12 | 1.0 | 9.9096E−01 | −1.4495E+00 | 0.0000E+00 | 0.0000E+00 |
| 17 | 1.0 | 2.3005E+00 | 6.4907E+00 | 0.0000E+00 | 0.0000E+00 |
| 18 | 1.0 | 1.2244E+01 | −2.2325E+02 | 2.7489E+03 | −1.7961E+04 |
| 19 | 1.0 | 1.1244E+01 | −1.9861E+02 | 2.2433E+03 | −1.2878E+04 |

[General Data]
Zoom ratio 2.822

| | Wide-angle end | Intermediate focal point | Telephoto end |
|---|---|---|---|
| f | 1.00000 | 1.63634 | 2.82177 |
| FNo | 3.57913 | 4.48247 | 5.80288 |
| ω | 29.01821 | 17.78749 | 10.59168 |
| Y | 0.524 | 0.524 | 0.524 |
| Bf | 0.53300 | 1.03947 | 1.18408 |
| TL | 3.155 | 3.428 | 4.402 |

[Zooming Data]

| Variable distance | Wide-angle end | Intermediate focal point | Telephoto end |
|---|---|---|---|
| D3 | 0.03010 | 0.25772 | 0.62245 |
| D9 | 0.67781 | 0.30314 | 0.09948 |
| D17 | 0.11854 | 0.09576 | 0.07388 |
| D19 | 0.55912 | 0.49568 | 1.18643 |
| D21 | 0.42708 | 0.93318 | 1.07780 |

[Zoom Lens Group Data]

| Group number | Group first surface | Group focal length | Lens configuration length |
|---|---|---|---|
| G1 | 1 | 2.85950 | 0.1344 |
| G2 | 4 | −0.79533 | 0.4075 |
| G3 | 11 | 0.63101 | 0.4939 |
| G4 | 18 | −0.76271 | 0.0545 |
| G5 | 20 | 3.08268 | 0.1455 |

[Conditional expression]

Conditional expression(1) $D1/fw = 0.134$
Conditional expression(2) $(TL5 - WL5)/ft = 0.231$
Conditional expression(3) $|(W45\beta - T45\beta)/(ft/fw)| = 0.342$ Based on Table 3, regarding zoom lens ZL3 according to the present example the conditional expressions (1) to (3) are satisfied.

Figure 6A:
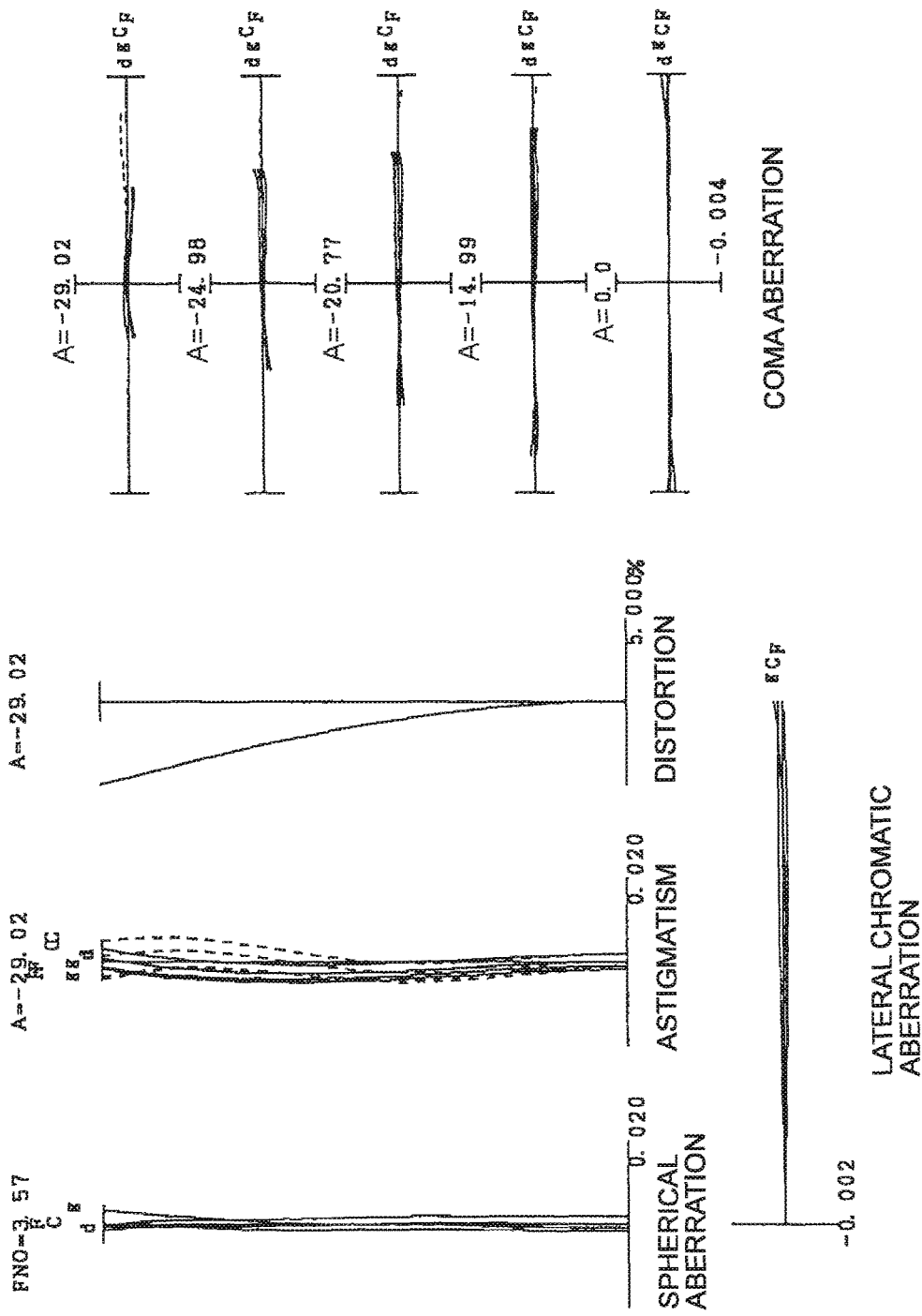

FIG. 6A to 6C illustrate graphs showing various aberrations (spherical aberration, astigmatism, distortion aberration, coma aberration, and lateral chromatic aberration) of zoom lens ZL3 according to Example 3. FIG. 6A illustrates graphs showing various aberrations upon focusing on infinity in the wide-angle end state of the present example, FIG. 6B illustrates graphs showing various aberrations upon focusing on infinity in the intermediate focal length state of the present example, and FIG. 6C illustrates graphs showing various aberrations upon focusing on infinity in the telephoto end state.

As is obvious in each graphs showing aberrations illustrated in FIGS. 6A to 6C, in the zoom lens ZL3 according to Example 3, it is understandable that various aberrations are properly corrected, and this has outstanding optical performance.

In order to have the present invention understandable, elements of the embodiment were attached and explained, however the present invention is not limited to the above.

For instance, in the examples above a five group configuration is exampled, however, this is applicable to another group configuration. Moreover, this is applicable to a configuration in which a lens or a lens group is added closest to the object, or a configuration in which a lens or a lens group is added closest to the image. Moreover, a lens group means a part that has at least one lens separated at an air interval which changes when zooming.

Moreover, it is appreciated that a focusing lens group is configured to focus on a short distance object from an infinity object by moving a single or a plurality of lens group (s), or a partial lens group in an optical axis direction. This focusing lens group is also applicable to autofocus, and is also suitable for motor drive for autofocus (using an ultrasonic motor, etc.). In particular, it is preferable that the fourth lens group G4 is used as a focusing lens group. Moreover, it is appreciated that the fifth lens group G5 is used as a focusing lens group. Or, it is also possible to perform focusing by synchronously moving the fourth lens group G4 and the fifth lens group G5.

Moreover, it is appreciated a vibration control lens group is configured to move a lens group or a partial lens group in manner of having a component in a direction perpendicular to the axis direction, or rotate and move (swing) it in a direction within a surface including the axis direction so that image blur due to camera shake is corrected. In particular, it is preferable that the second lens group G2 or the third lens group G3 is used as a vibration control lens group.

Moreover, it is also appreciated that a lens surface is formed with a spherical surface or a plane, or formed in an aspherical surface. In case a lens surface has a spherical surface or a plane, it is possible to easily have lens processing and an assembly adjustment, and to prevent degradation of optical performance due to errors of the processing and the assembly adjustment, thus it is preferable. Moreover, it is preferable because there is less degradation of the depiction performance when an image surface is shifted. In case a lens surface has an aspherical surface, it is appreciated that the aspherical surface is formed as any one of an aspherical surface which is formed through grinding processing, a glass mold aspherical surface which glass is formed into a aspherical surface configuration using a mold, and a complexed aspherical surface which a resin is formed on a surface of glass and formed in a aspherical surface configuration. Moreover, it is appreciated that a lens surface is formed as a diffractive surface, additionally a lens is formed as a graded-index lens (GRIN lens) or a plastic lens.

The aperture stop S is preferable to be disposed in a neighborhood of the third lens group G3, however this is substituted using a frame of a lens instead of providing a member as an aperture stop.

It is appreciated a reflection reducing film having high transmittivity in a wide wavelength band is formed on each lens surface in order to reduce flare and ghosting and attain a high optical performance with high contrast.

EXPLANATION OF NUMERALS AND CHARACTERS

ZL (ZL1 to ZL3) Zoom lens
G1 First lens group
G2 Second lens group
G3 Third lens group
G4 Fourth lens group
G5 Fifth lens group
S Aperture stop
FL Filter group
I Image surface
CAM Digital still camera (optical apparatus)

RELATED APPLICATIONS

This is a continuation of PCT International Application No. PCT/JP2014/005686, filed on Nov. 12, 2014, which is hereby incorporated by reference. This application also claims the benefit of Japanese Patent Application Nos. 2013-240956 and 2013-240957, filed in Japan on Nov. 21, 2013, which are hereby incorporated by reference.

The invention claimed is:

1. A zoom lens comprising, in order on an optical axis from an object, a first lens group having positive refractive power, a second lens group having negative refractive power, a third lens group having positive refractive power, a fourth lens group having negative refractive power, and a fifth lens group having positive refractive power, each distance between adjacent lens groups changing when zooming, the first lens group being composed of two lenses, and
the following conditional expressions being satisfied:

$$0.07 < D1/fw < 0.46$$

$$0.23 < (TL5-WL5)/ft < 1.20$$

where D1 denotes a thickness on the optical axis of the first lens group,
fw denotes a focal length of the zoom lens in a wide-angle end state,
WL5 denotes a distance on the optical axis from a surface closest to the object in the fifth lens group to an image surface in the wide-angle end state,
TL5 denotes a distance on the optical axis from the surface closest to the object in the fifth lens group to the image surface in a telephoto end state, and
ft denotes a focal length of the zoom lens in the telephoto end state.

2. A zoom lens according to claim 1, wherein all the lens groups move on the optical axis when zooming.

3. A zoom lens according to claim 1, wherein a distance on the optical axis from a surface closest to the object in the fifth lens group to an image surface is larger in a telephoto end state than in the wide-angle end state.

4. A zoom lens according to claim 1, wherein the first lens group is composed of, in order from the object, a negative lens, and a positive lens.

5. A zoom lens according to claim 1, wherein the first lens group is a cemented lens composed of the two lenses.

6. A zoom lens according to claim 1, wherein the second lens group is composed of, in order from the object, a negative lens, a negative lens, and a positive lens.

7. A zoom lens according to claim 1, wherein the following conditional expression is satisfied:

$$0.08<|(W45\beta-T45\beta)/(ft/fw)|$$

where W45β denotes a composite magnification of the fourth lens group and the fifth lens group in the wide-angle end state, T45β denotes a composite magnification of the fourth lens group and the fifth lens group in the telephoto end state, and ft denotes a focal length of the zoom lens in the telephoto end state.

8. An optical apparatus equipped with the zoom lens according to claim 1.

9. A zoom lens according to claim 1, wherein:
all the lens groups move on the optical axis when zooming,
the third lens group is composed of, in order from the object, a positive lens, a cemented lens of a positive lens and a negative lens, and a positive lens,
the fourth lens group is composed of a single negative lens,
the fifth lens group is composed of a positive meniscus lens having a convex surface facing the object,
an aperture stop is disposed between the second lens group and the third lens group, and
the aperture stop is moved with the third lens group on the optical axis when zooming.

10. A zoom lens comprising, in order on an optical axis from an object, a first lens group having positive refractive power, a second lens group having negative refractive power, a third lens group having positive refractive power, a fourth lens group having negative refractive power, and a fifth lens group having positive refractive power, each distance between adjacent lens groups changing when zooming, the first lens group being composed of two lenses, and
the following conditional expression being satisfied:

$$0.08<|(W45\beta-T45\beta)/(ft/fw)|$$

where W45β denotes a composite magnification of the fourth lens group and the fifth lens group in a wide-angle end state, T45β denotes a composite magnification of the fourth lens group and the fifth lens group in a telephoto end state, ft denotes a focal length of the zoom lens in the telephoto end state, and fw denotes a focal length of the zoom lens in the wide-angle end state.

11. An optical apparatus equipped with the zoom lens according to claim 10.

12. A zoom lens according to claim 10, wherein:
the following conditional expression is satisfied:
0.23<(TL5-WL5)/ft <1.20
where WL5 denotes a distance on the optical axis from a surface closest to the object in the fifth lens group to an image surface in the wide-angle end state, TL5 denotes a distance on the optical axis from the surface closest to the object in the fifth lens group to the image surface in the telephoto end state, and ft denotes a focal length of the zoom lens in the telephoto end state, the fifth lens group is composed of a single positive lens, and an aperture stop is disposed between the second lens group and the third lens group.

13. A manufacturing method of a zoom lens, comprising:
disposing in a lens barrel, in order on an optical axis from an object, a first lens group having positive refractive power, a second lens group having negative refractive power, a third lens group having positive refractive power, a fourth lens group having negative refractive power, and a fifth lens group having positive refractive power, such that each distance between adjacent lens groups changes when zooming,
the first lens group being composed of two lenses, and satisfying the following conditional expressions:

$$0.07<D1/fw<0.46$$

$$0.23<(TL5-WL5)/ft<1.20$$

where D1 denotes a thickness on the optical axis of the first lens group, fw denotes a focal length of the zoom lens in a wide-angle end state, WL5 denotes a distance on the optical axis from a surface closest to the object in the fifth lens group to an image surface in the wide-angle end state, TL5 denotes a distance on the optical axis from the surface closest to the object in the fifth lens group to the image surface in a telephoto end state, and ft denotes a focal length of the zoom lens in the telephoto end state.

14. A manufacturing method of a zoom lens according to claim 13, wherein the lens groups are disposed in the lens-barrel so that a distance on the optical axis from a surface closest to the object in the fifth lens group to an image surface is larger in the telephoto end state than the wide-angle end state.

15. A manufacturing method of the zoom lens according to claim 13, wherein the lens groups are disposed in the lens-barrel so that the following conditional expression is satisfied:

$$0.08<|(W45\beta-T45\beta)/(ft/fw)|$$

where W45β denotes a composite magnification of the fourth lens group and the fifth lens group in the wide-angle end state, T45β denotes a composite magnification of the fourth lens group and the fifth lens group in the telephoto end state, and ft denotes a focal length of the zoom lens in the telephoto end state.

16. A manufacturing method of a zoom lens according to claim 13, wherein:
all the lens groups are disposed to move on the optical axis when zooming,
the third lens group is composed of, in order from the object, a positive lens, a cemented lens of a positive lens and a negative lens, and a positive lens,
the fourth lens group is composed of a single negative lens,
the fifth lens group is composed of a positive meniscus lens having a convex surface facing the object, an aperture stop is disposed between the second lens group and the third lens group, and the aperture stop is disposed to move with the third lens group on the optical axis when zooming.

17. A manufacturing method of a zoom lens, comprising:

disposing in a lens barrel, in order on an optical axis from an object, a first lens group having a positive refractive power, a second lens group having a negative refractive power, a third lens group having a positive refractive power, a fourth lens group having a negative refractive power, and a fifth lens group having a positive refractive power, such that each distance between adjacent lens groups changes when zooming, the first lens group being composed of two lenses, and satisfying the following conditional expression:

$0.08 < |(W45\beta - T45\beta)/(ft/fw)|$ where W45β denotes a composite magnification of the fourth lens group and the fifth lens group in a wide-angle end state, T45β denotes a composite magnification of the fourth lens group and the fifth lens group in a telephoto end state, ft denotes a focal length of the zoom lens in the telephoto end state, and fw denotes a focal length of the zoom lens in the wide-angle end state.

18. A manufacturing method of a zoom lens according to claim 17, wherein:

the following conditional expression is satisfied:

$0.23 < (TL5-WL5)/ft < 1.20$ where WL5 denotes a distance on the optical axis from a surface closest to the object in the fifth lens group to an image surface in the wide-angle end state, TL5 denotes a distance on the optical axis from the surface closest to the object in the fifth lens group to the image surface in the telephoto end state, and ft denotes a focal length of the zoom lens in the telephoto end state, the fifth lens group is composed of a single positive lens, and an aperture stop is disposed between the second lens group and the third lens group.

* * * * *